(12) United States Patent
Loeffelholz et al.

(10) Patent No.: US 9,261,663 B2
(45) Date of Patent: Feb. 16, 2016

(54) FIBER OPTIC DISTRIBUTION TERMINAL AND METHOD OF DEPLOYING FIBER DISTRIBUTION CABLE

(75) Inventors: Todd Loeffelholz, Minnetonka, MN (US); Hai Bin Lei, Shanghai (CN); Mao Nian Tang, Su Qian (CN); Xiu Hua Chen, Shanghai (CN)

(73) Assignee: ADC Communications (Shanghai) Co., LTD. (CN)

( * ) Notice: Subject to any disclaimer, the term of this patent is extended or adjusted under 35 U.S.C. 154(b) by 322 days.

(21) Appl. No.: 13/805,152

(22) PCT Filed: Jun. 18, 2010

(86) PCT No.: PCT/CN2010/074062
§ 371 (c)(1),
(2), (4) Date: Dec. 18, 2012

(87) PCT Pub. No.: WO2011/156969
PCT Pub. Date: Dec. 22, 2011

(65) Prior Publication Data
US 2013/0094828 A1    Apr. 18, 2013

(51) Int. Cl.
*G02B 6/00* (2006.01)
*G02B 6/44* (2006.01)
*G02B 6/46* (2006.01)
*H02G 11/02* (2006.01)

(52) U.S. Cl.
CPC ............... *G02B 6/44* (2013.01); *G02B 6/4453* (2013.01); *G02B 6/46* (2013.01); *G02B 6/4457* (2013.01); *H02G 11/02* (2013.01); *Y10T 29/49826* (2015.01)

(58) Field of Classification Search
CPC combination set(s) only.
See application file for complete search history.

(56) References Cited

U.S. PATENT DOCUMENTS

| 1,276,825 A | 8/1918 | Swope |
| 1,442,999 A | 1/1923 | Boardman et al. |
| 1,446,410 A | 2/1923 | McCormick et al. |

(Continued)

FOREIGN PATENT DOCUMENTS

| CN | 1914776 A | 2/2007 |
| DE | 42 26 368 A1 | 2/1994 |

(Continued)

OTHER PUBLICATIONS

International Search Report and Written Opinion for PCT/CN2010/074062 mailed Mar. 31, 2011.

(Continued)

*Primary Examiner* — Hemang Sanghavi
(74) *Attorney, Agent, or Firm* — Merchant & Gould P.C.

(57) ABSTRACT

A fiber optic distribution terminal includes an enclosure having a base. A cover is pivotally engaged to the base. The base and the cover cooperatively define an interior region. A cable spool assembly is disposed in the interior region of the enclosure. The cable spool assembly includes a first flange and a second flange. The first flange has a flange and an inner drum that extends outwardly from the flange. The second flange has a tray and an outer drum that extends outwardly from the tray. The outer drum defines a bore. The outer drum is in snap-fit engagement with the inner drum. A plurality of adapters is disposed on the tray. A fiber optic cable is disposed about the outer drum of the cable spool assembly. The fiber optic cable includes a plurality of connectorized ends that is engaged with first ports of the plurality of adapters.

22 Claims, 19 Drawing Sheets

(56) References Cited

U.S. PATENT DOCUMENTS

| | | | |
|---|---|---|---|
| 1,474,580 A | 11/1923 | Clark et al. |
| RE20,995 E | 2/1939 | Beasley |
| 2,502,496 A | 4/1950 | Wickman |
| 2,521,226 A | 9/1950 | Keller |
| 2,727,703 A | 12/1955 | Bonnett |
| 3,131,729 A | 5/1964 | Rudolf |
| 3,657,491 A | 4/1972 | Ryder et al. |
| 3,667,417 A | 6/1972 | Clinkenbeard |
| 3,920,308 A | 11/1975 | Murray |
| 3,940,086 A | 2/1976 | Stoquelet |
| 4,053,118 A | 10/1977 | Aikins |
| 4,081,258 A | 3/1978 | Goell et al. |
| 4,384,688 A | 5/1983 | Smith |
| 4,587,801 A | 5/1986 | Missout et al. |
| 4,635,875 A | 1/1987 | Apple |
| 4,666,237 A | 5/1987 | Mallinson |
| 4,767,073 A | 8/1988 | Malzacher |
| 4,869,437 A | 9/1989 | Berz et al. |
| 4,883,337 A | 11/1989 | Dahlgren |
| 4,913,369 A | 4/1990 | Lia et al. |
| 4,939,798 A | 7/1990 | Last |
| 4,940,859 A | 7/1990 | Peterson |
| 5,016,554 A | 5/1991 | Harris et al. |
| 5,066,256 A | 11/1991 | Ward |
| 5,074,863 A | 12/1991 | Dines |
| 5,185,843 A | 2/1993 | Aberson et al. |
| 5,265,815 A | 11/1993 | Soyka et al. |
| 5,280,861 A | 1/1994 | Corriveau |
| 5,317,663 A | 5/1994 | Beard et al. |
| 5,326,040 A | 7/1994 | Kramer |
| 5,335,874 A | 8/1994 | Shrum et al. |
| 5,494,234 A | 2/1996 | Kramer |
| 5,494,446 A | 2/1996 | DeLucia et al. |
| 5,497,444 A | 3/1996 | Wheeler |
| 5,519,275 A | 5/1996 | Scott et al. |
| 5,522,561 A | 6/1996 | Koyamatsu et al. |
| 5,544,836 A | 8/1996 | Pera |
| 5,551,545 A | 9/1996 | Gelfman |
| 5,638,481 A | 6/1997 | Arnett |
| 5,657,412 A | 8/1997 | Caudrelier |
| 5,703,990 A | 12/1997 | Robertson et al. |
| 5,709,347 A | 1/1998 | Hoffmann et al. |
| 5,717,810 A | 2/1998 | Wheeler |
| 5,718,397 A | 2/1998 | Stevens |
| 5,749,148 A | 5/1998 | White et al. |
| 5,787,219 A | 7/1998 | Muellet et al. |
| 5,915,640 A | 6/1999 | Wagter et al. |
| 5,956,449 A | 9/1999 | Otani et al. |
| 5,987,203 A | 11/1999 | Abel et al. |
| 5,992,787 A | 11/1999 | Burke |
| 6,091,876 A * | 7/2000 | Hizuka et al. ................. 385/135 |
| 6,220,413 B1 | 4/2001 | Walters et al. |
| 6,315,598 B1 | 11/2001 | Elliot et al. |
| 6,367,347 B1 | 4/2002 | Blaschke et al. |
| 6,494,396 B2 | 12/2002 | Sugata |
| 6,522,826 B2 | 2/2003 | Gregory |
| 6,554,221 B2 | 4/2003 | Hinds |
| 6,591,051 B2 | 7/2003 | Solheid et al. |
| 6,616,080 B1 | 9/2003 | Edwards et al. |
| 6,643,443 B2 | 11/2003 | Holman et al. |
| 6,669,129 B1 | 12/2003 | Shah |
| 6,711,339 B2 | 3/2004 | Puetz et al. |
| 6,745,971 B1 * | 6/2004 | Renzoni ..................... 242/388.1 |
| 6,834,517 B2 | 12/2004 | Sheehy, Jr. |
| 6,856,748 B1 | 2/2005 | Elkins, II et al. |
| 6,915,058 B2 | 7/2005 | Pons |
| 6,937,725 B2 | 8/2005 | Liao |
| 6,997,410 B1 | 2/2006 | Huang |
| 7,000,863 B2 | 2/2006 | Bethea et al. |
| 7,011,538 B2 | 3/2006 | Chang |
| 7,016,590 B2 | 3/2006 | Tanaka et al. |
| 7,017,721 B1 | 3/2006 | Bradford et al. |
| 7,220,144 B1 | 5/2007 | Elliot et al. |
| 7,315,681 B2 | 1/2008 | Kewitsch |
| 7,346,253 B2 | 3/2008 | Bloodworth et al. |
| 7,364,108 B2 | 4/2008 | Kim et al. |
| 7,369,739 B2 | 5/2008 | Kline et al. |
| 7,397,997 B2 | 7/2008 | Ferris et al. |
| 7,400,814 B1 | 7/2008 | Hendrickson et al. |
| 7,477,829 B2 | 1/2009 | Kaplan |
| 7,522,806 B2 | 4/2009 | Hendrickson et al. |
| 7,533,841 B1 | 5/2009 | Harrison et al. |
| 7,546,018 B2 | 6/2009 | Hendrickson et al. |
| 7,676,136 B2 | 3/2010 | Wakileh et al. |
| 7,715,679 B2 | 5/2010 | Kowalczyk et al. |
| 7,756,379 B2 | 7/2010 | Kowalczyk et al. |
| 7,809,234 B2 | 10/2010 | Smith et al. |
| 7,869,682 B2 | 1/2011 | Kowalczyk et al. |
| 7,894,701 B2 | 2/2011 | Kowalczyk et al. |
| 8,009,954 B2 | 8/2011 | Bran de Leon et al. |
| 8,131,126 B2 | 3/2012 | Kowalczyk et al. |
| 8,189,984 B2 | 5/2012 | Kowalczyk et al. |
| 8,229,267 B2 | 7/2012 | Kowalczyk et al. |
| 8,265,447 B2 | 9/2012 | Loeffelholz et al. |
| 8,380,035 B2 | 2/2013 | Kowalczyk et al. |
| 8,494,333 B2 | 7/2013 | Kowalczyk et al. |
| 8,494,334 B2 | 7/2013 | Kowalczyk et al. |
| 8,705,929 B2 | 4/2014 | Kowalczyk et al. |
| 8,891,931 B2 | 11/2014 | Kowalczyk et al. |
| 9,063,316 B2 | 6/2015 | Loeffelholz et al. |
| 2001/0048044 A1 | 12/2001 | Sugata |
| 2002/0003186 A1 | 1/2002 | Hinds |
| 2002/0023814 A1 | 2/2002 | Poutiatine |
| 2002/0126980 A1 | 9/2002 | Holman et al. |
| 2002/0164121 A1 | 11/2002 | Brennan et al. |
| 2002/0171002 A1 | 11/2002 | Kretsch et al. |
| 2003/0037480 A1 | 2/2003 | Davis |
| 2004/0170369 A1 * | 9/2004 | Pons ........................... 385/135 |
| 2004/0244430 A1 | 12/2004 | Sheehy et al. |
| 2005/0145522 A1 * | 7/2005 | Bloodworth et al. ........ 206/409 |
| 2005/0213920 A1 | 9/2005 | Tanaka et al. |
| 2005/0247136 A1 | 11/2005 | Cross et al. |
| 2005/0258411 A1 | 11/2005 | Zeitler |
| 2006/0163403 A1 | 7/2006 | Dickson |
| 2006/0183362 A1 | 8/2006 | Mullaney et al. |
| 2006/0210230 A1 | 9/2006 | Kline et al. |
| 2007/0025675 A1 | 2/2007 | Kramer |
| 2007/0036506 A1 * | 2/2007 | Kewitsch ..................... 385/135 |
| 2007/0165995 A1 | 7/2007 | Reagan et al. |
| 2007/0189691 A1 | 8/2007 | Barth et al. |
| 2008/0035778 A1 | 2/2008 | Belden et al. |
| 2008/0037945 A1 | 2/2008 | Gniadek et al. |
| 2008/0118207 A1 * | 5/2008 | Yamamoto et al. ............. 385/88 |
| 2008/0218947 A1 | 9/2008 | Atkinson |
| 2008/0236209 A1 | 10/2008 | Conti et al. |
| 2008/0292261 A1 | 11/2008 | Kowalczyk et al. |
| 2008/0315030 A1 | 12/2008 | Hendrickson et al. |
| 2009/0074370 A1 | 3/2009 | Kowalczyk et al. |
| 2009/0190894 A1 | 7/2009 | Nhep et al. |
| 2009/0317047 A1 | 12/2009 | Smith et al. |
| 2010/0054680 A1 | 3/2010 | Lochkovic et al. |
| 2010/0090830 A1 | 4/2010 | Conti et al. |
| 2010/0166376 A1 | 7/2010 | Nair et al. |
| 2011/0044599 A1 | 2/2011 | Kowalczyk et al. |
| 2011/0094274 A1 | 4/2011 | Conti et al. |
| 2011/0222829 A1 | 9/2011 | Loeffelholz et al. |
| 2013/0170811 A1 | 7/2013 | Kowalczyk et al. |
| 2014/0010512 A1 | 1/2014 | Kowalczyk et al. |
| 2014/0010513 A1 | 1/2014 | Kowalczyk et al. |

FOREIGN PATENT DOCUMENTS

| | | |
|---|---|---|
| EP | 1 107 031 A1 | 6/2001 |
| FR | 2 566 997 A1 | 1/1986 |
| JP | 9-236709 | 9/1997 |
| JP | 11-349230 | 12/1999 |
| JP | 2003-114339 | 4/2003 |
| JP | 2005-73365 | 3/2005 |
| JP | 2005-249858 | 9/2005 |
| KR | 20-0380996 | 3/2005 |
| WO | WO 2008/137894 A1 | 11/2008 |
| WO | WO 2009/108846 A2 | 9/2009 |
| WO | WO 2010/001160 A1 | 1/2010 |
| WO | WO 2011/156969 A1 | 12/2011 |

(56) References Cited

FOREIGN PATENT DOCUMENTS

OTHER PUBLICATIONS

7 Inch Modules, ADC Telecommunications, Inc, © 1998, "7 Inch Connector Module with IFC", pp. 127.

Description of Admitted Prior Art, 30 pages.

F3DF Modules, ADC Telecommunications, Inc. © 1995, "Individual 12-Pack Assemblies", pp. 90.

Fiber Cable Management Products, Third Edition, ADC Telecommunications, Inc., © 1995, 1998.

Fiber Distribution Frame, Pre-Terminated Rear Load Connector Module, Installation Instructions, ADC Telecommunications, Inc., © 2000.

Fiber Main Distribution Frame (FMDF), Fiber Terminal Block, Installation Instructions, ADC Telecommunications, Inc., © 2001.

Fiber Panel Products—Cable Management Tray Panels, ADC Telecommunications, Inc., © 1994, 1996 "72 Fiber Distribution Module (FDM) with Intrafacility Fiber Cable", pp. 56.

Fiber Panel Products, Second Edition, ADC Telecommunications, Inc., © 1994, 1996.

FL2000 Products—Preconfigured Panels, ADC Telecommunications, Inc., © 2000 "Rack or Cabinet Mount Termination Panel with Multifiber Cable", pp. 13.

FL2000 Products, ADC Telecommunications, Inc., © 1994, 1996.

FL2000 Products, ADC Telecommunications, Inc., © 1994, 1996, "Rack Mount Panel with Intrafacility Fiber Cable", pp. 16.

IFC Style Frame Modules, ADC Telecommunications, Inc., © 1995, "Connector Module Equipped with IFC", pp. 27.

Next Generation Frame (NGF), Product Family Ordering Guide, ADC Telecommunications, Inc., © 1996, 1999, 2000, "Fiber Termination Blocks (FTB) Preterminated", pp. 8.

Next Generation Frame (NGF), Product Family Ordering Guide, ADC Telecommunications, Inc., © 1996, 1999, 2000.

Next Generation Frames—Fiber Termination Blocks, ADC Telecommunication, Inc., © 1998, "Fiber Termination Blocks (FTB) Preterminated" pp. 6.

Value-Added Module System, ADC Telecommunications, Inc., © 1993, 1194, 1998, "12-Pack Module Assemblies", pp. 30-31.

\* cited by examiner

FIBER OPTIC DISTRIBUTION TERMINAL AND METHOD OF DEPLOYING FIBER DISTRIBUTION CABLE

This application is a National Stage Application of PCT/CN2010/074062, filed Jun. 18, 2010, and which application is incorporated herein by reference. To the extent appropriate, a claim of priority is made to the above disclosed application.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic distribution terminal. The fiber optic distribution terminal includes an enclosure having a base including a base wall and a plurality of sidewalls that extend outwardly from the base wall. A cover is pivotally engaged to the base. The base and the cover cooperatively define an interior region. A cable spool assembly is disposed in the interior region of the enclosure. The cable spool assembly includes a first flange and a second flange. The first flange has a flange and an inner drum that extends outwardly from the flange. The second flange has a tray and an outer drum that extends outwardly from the tray. The outer drum defines a bore. The outer drum is in snap-fit engagement with the inner drum. A plurality of adapters is disposed on the tray. Each of the plurality of adapters defines a first port and an oppositely disposed second port. A fiber optic cable is disposed about the outer drum of the cable spool assembly. The fiber optic cable includes a plurality of connectorized ends that is engaged with the first ports of the plurality of adapters.

Another aspect of the present disclosure relates to a method of deploying a fiber distribution cable from an enclosure. The method includes removing a cover of an enclosure from a base of the enclosure. A locking mechanism disposed in an interior region of the enclosure is disengaged from a first flange of a cable spool assembly that is disposed in the interior region of the enclosure. An end of a fiber distribution cable that extends from a cable slot of the enclosure is pulled so that the cable spool assembly disposed in the interior region of the enclosure rotates. The locking mechanism is engaged to the first flange of the cable spool assembly. The cover is installed to the base.

Another aspect of the present disclosure relates to a fiber optic distribution terminal. The fiber optic distribution terminal includes an enclosure having a base including a base wall and a plurality of sidewalls that extend outwardly from the base wall. A cover is pivotally engaged to the base. The base and the cover cooperatively define an interior region. A cable spool assembly is disposed in the interior region of the enclosure. The cable spool assembly includes a first flange and a second flange. The first flange has a flange and an inner drum that extends outwardly from the flange. The flange defines a notch that extends radially inward from an outer edge of the flange. The second flange has a tray and an outer drum that extends outwardly from the tray. The outer drum defines a bore. The outer drum is in engagement with the inner drum so that the inner drum is disposed in the bore of the outer drum. A plurality of adapters is disposed on the tray. Each of the plurality of adapters defines a first port and an oppositely disposed second port. A locking mechanism slidably disposed on the base wall of the base of the enclosure. The locking mechanism is slidable between a disengaged position and an engaged position. The locking mechanism includes an engagement portion that is adapted for disposition in the notch in the engaged position. A fiber optic cable is disposed about the outer drum of the cable spool assembly. The fiber optic cable includes a plurality of connectorized ends that is engaged with the first ports of the plurality of adapters.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
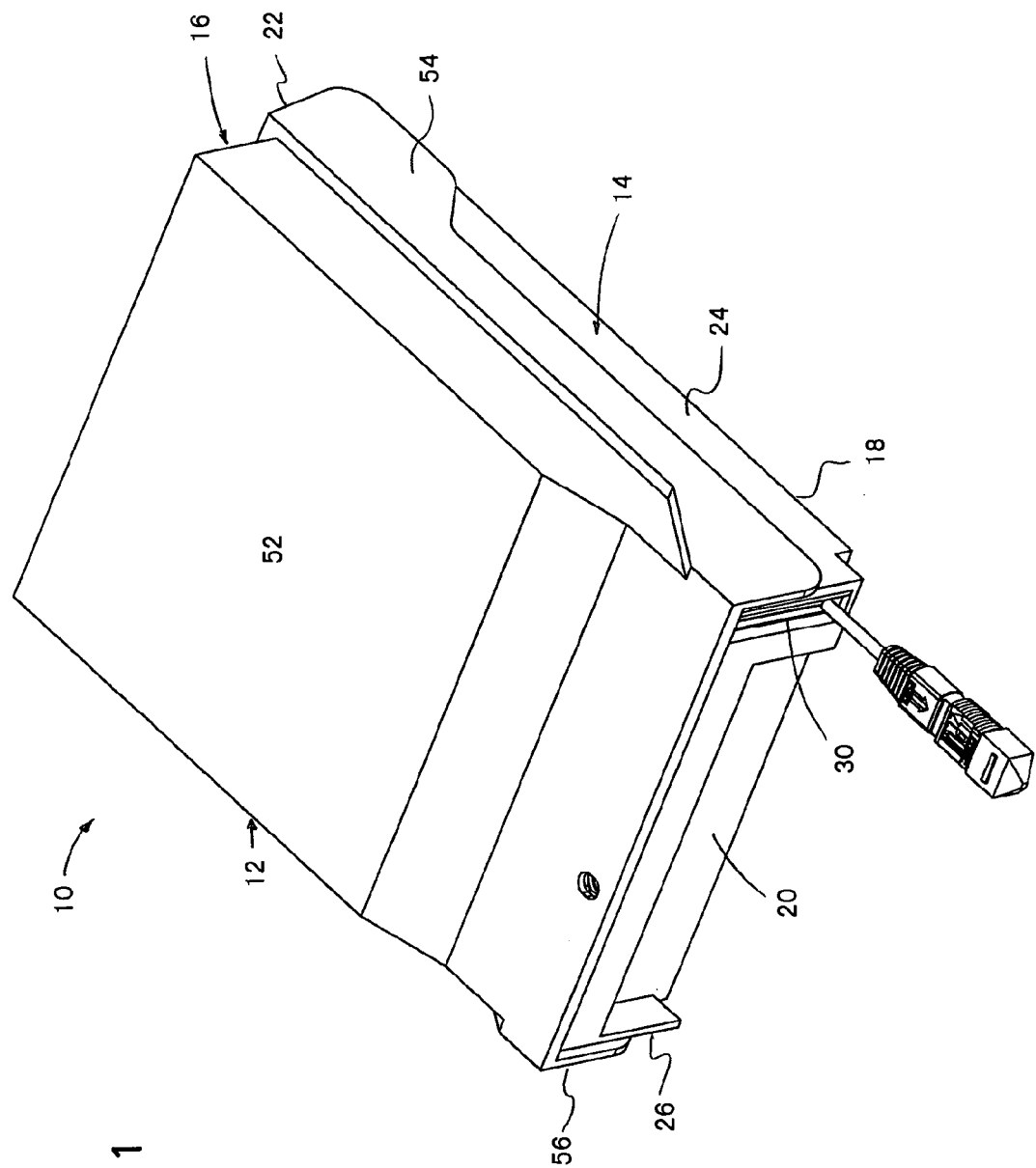
FIG. 1 is a perspective view of a fiber optic distribution terminal having exemplary features of aspects in accordance with the principles of the present disclosure.

Referring now to FIG. 1, a fiber optic distribution terminal 10 is shown. The fiber optic distribution terminal 10 includes an enclosure 12. The enclosure 12 includes a base 14 and a cover 16. In the depicted embodiment, the cover 16 is pivotally engaged with the base 14.

Figure 2:
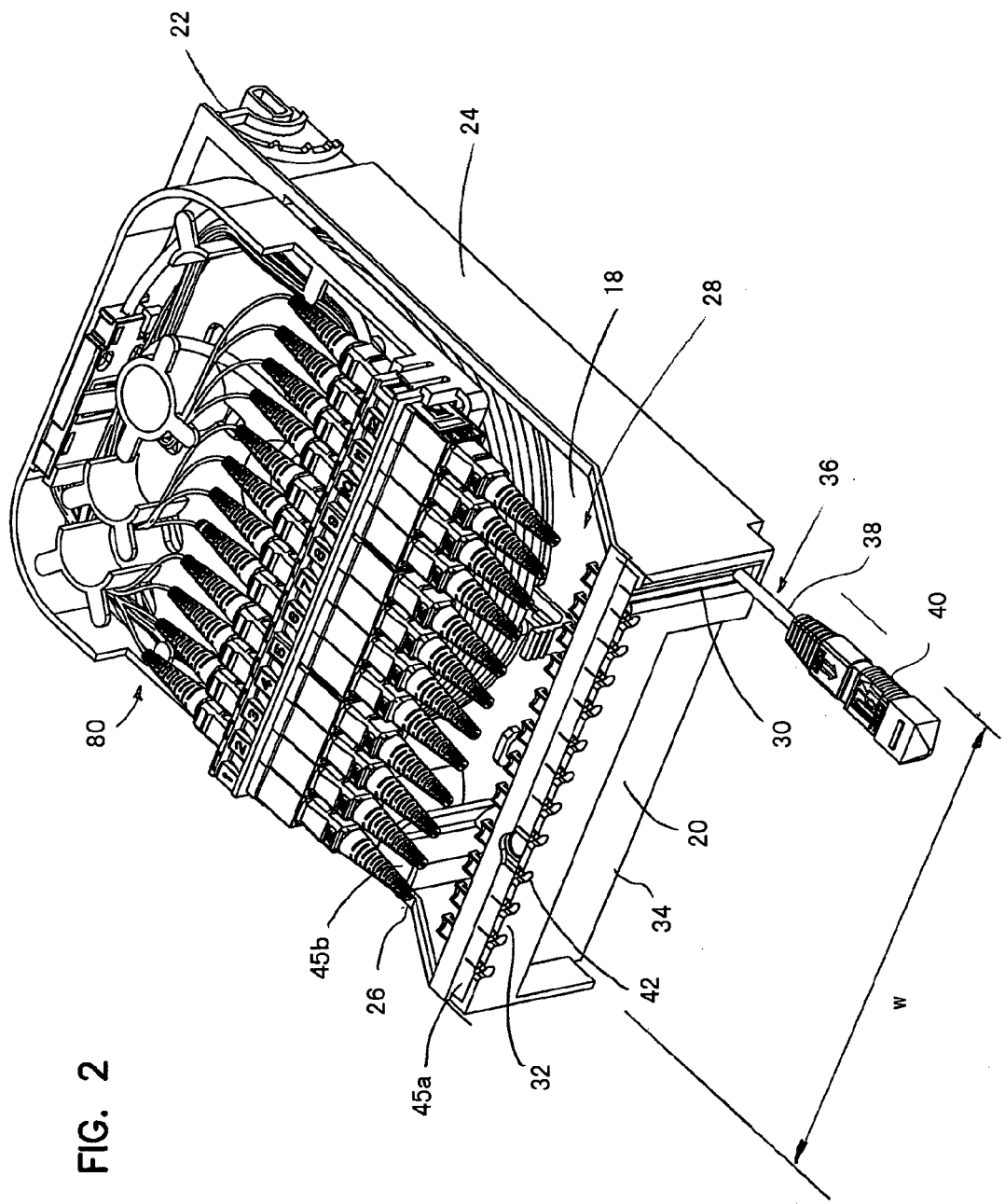
FIG. 2 is a perspective view of the fiber optic distribution terminal of FIG. 1 with a cover removed from a base.

Referring now to FIGS. 1 and 2, the base 14 includes a base wall 18, a first sidewall 20, an oppositely disposed second sidewall 22, a third sidewall 24 that extends between the first and second sidewalls 20, 22 and an oppositely disposed fourth sidewall 26. The first, second, third and fourth sidewalls 20, 22, 24, 26 extend outwardly from the base wall 18. In the depicted embodiment, the first, second, third and fourth sidewalls 20, 22, 24, 26 are generally perpendicular to the base wall 18.

The cover 16, the base wall 18 and the first, second, third and fourth sidewalls 20, 22, 24, 26 of the base 14 cooperatively define an interior region 28. The first sidewall 20 defines a cable slot 30. In the depicted embodiment, the cable slot 30 is configured to provide access to the interior region 28 of the enclosure 12. The cable slot 30 extends along the first sidewall 20 from a first end 32 of the first sidewall 20, which is oppositely disposed from the base wall 18, toward a second end 34, which is adjacent to the base wall 18.

The cable slot 30 is adapted to provide a path through which the distribution cable 36 can exit the interior region 28 of the enclosure 12. The distribution cable 36 is adapted for connection to a fiber distribution hub. In the depicted embodiment, the distribution cable 36 includes a first end 38 having a multi-fiber connector 40.

Figure 5:
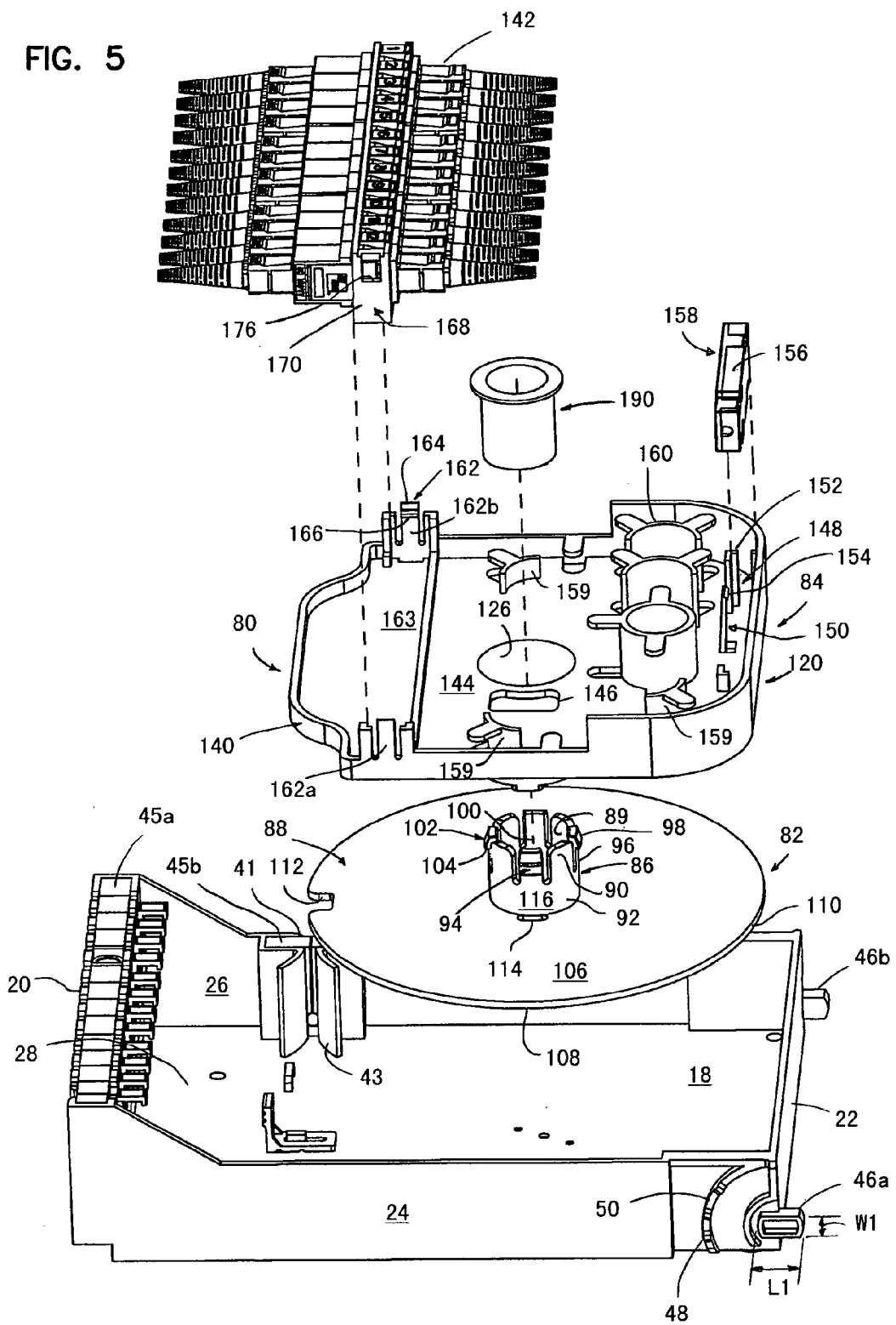
FIG. 5 is an exploded perspective view of the fiber optic distribution terminal of FIG. 2.
Figure 6:
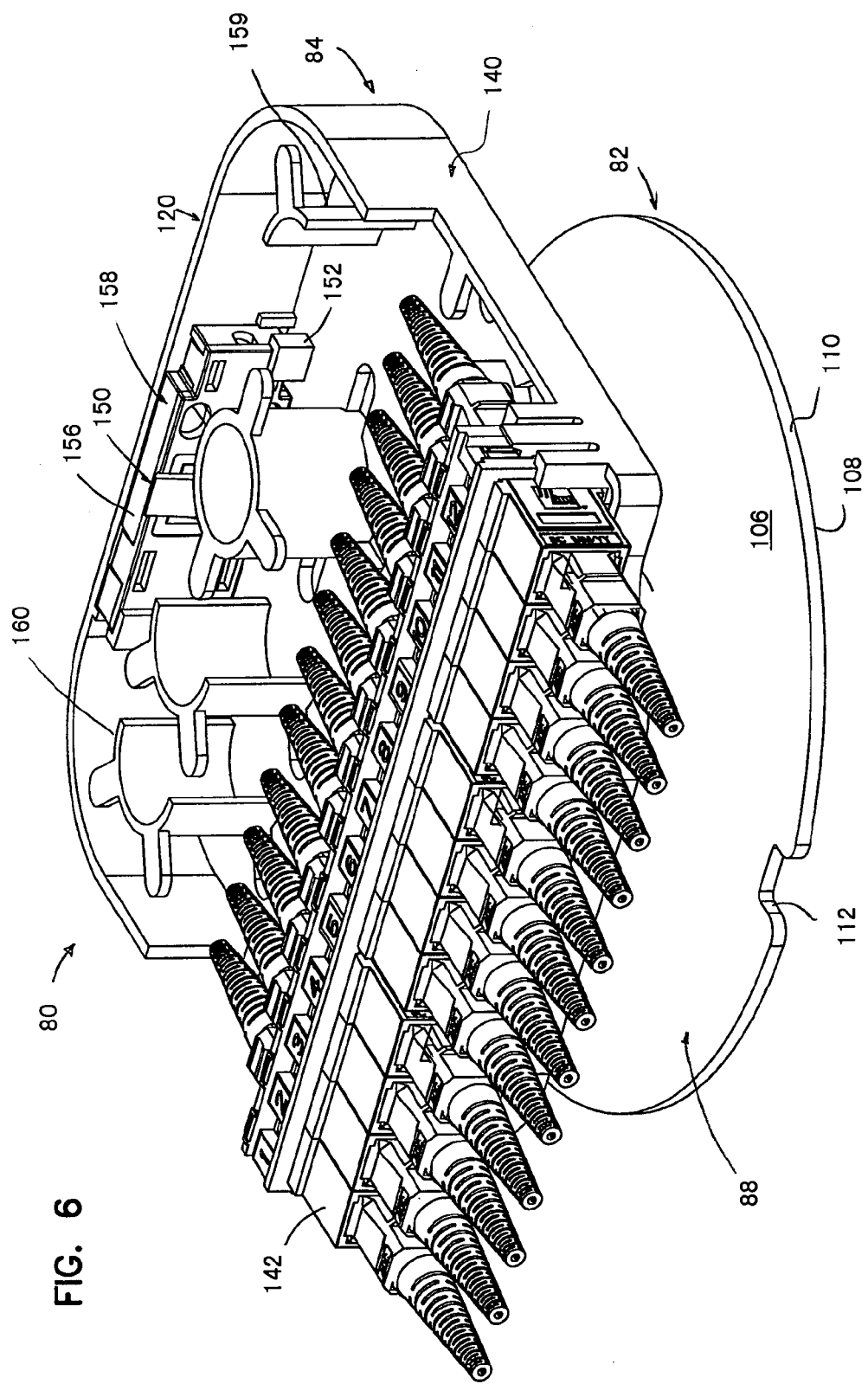
FIG. 6 is a perspective view of a cable spool assembly suitable for use with the fiber optic distribution terminal of FIG. 1.
Figure 7:
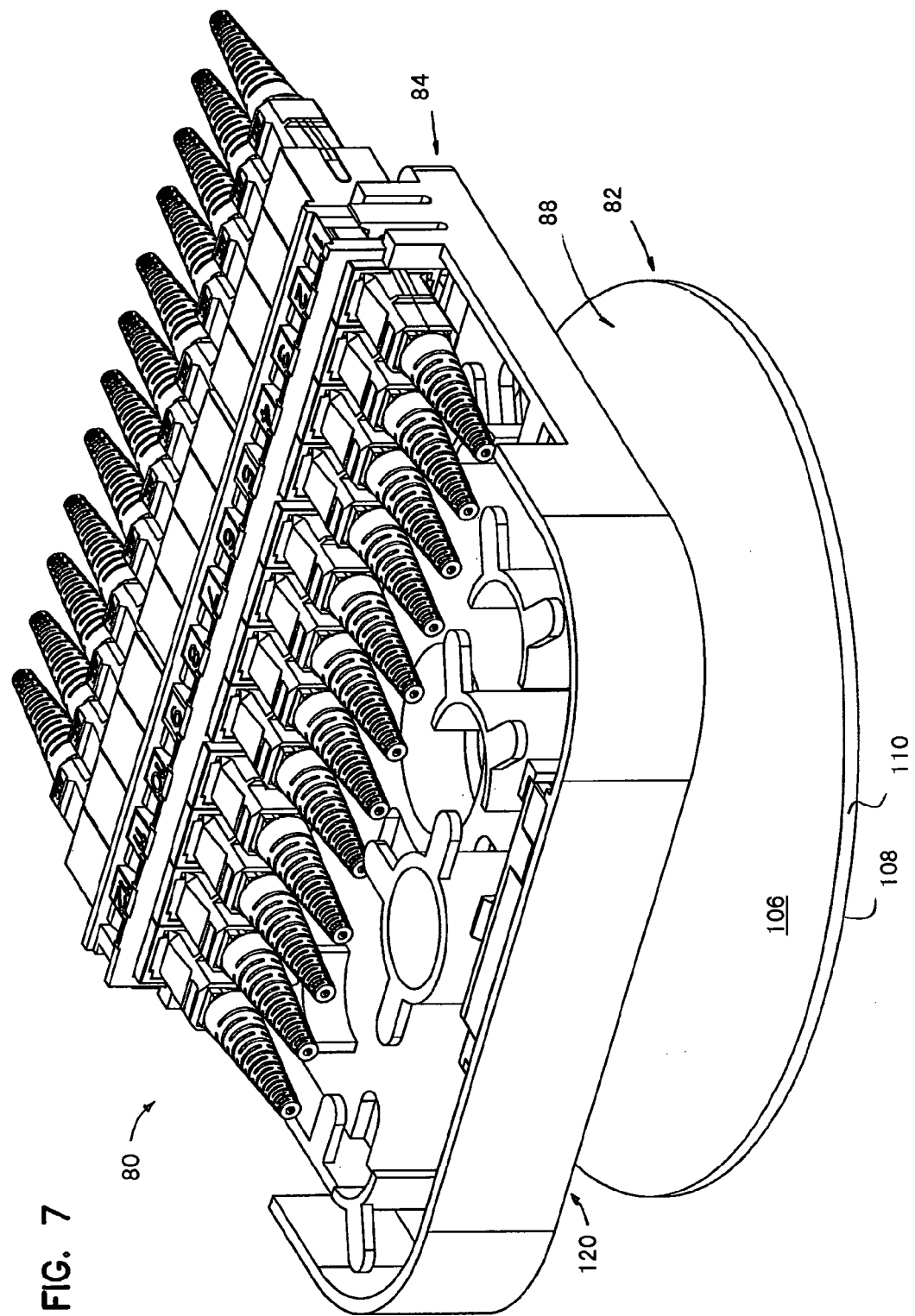
FIG. 7 is a perspective view of the cable spool assembly of FIG. 6.
Figure 8:
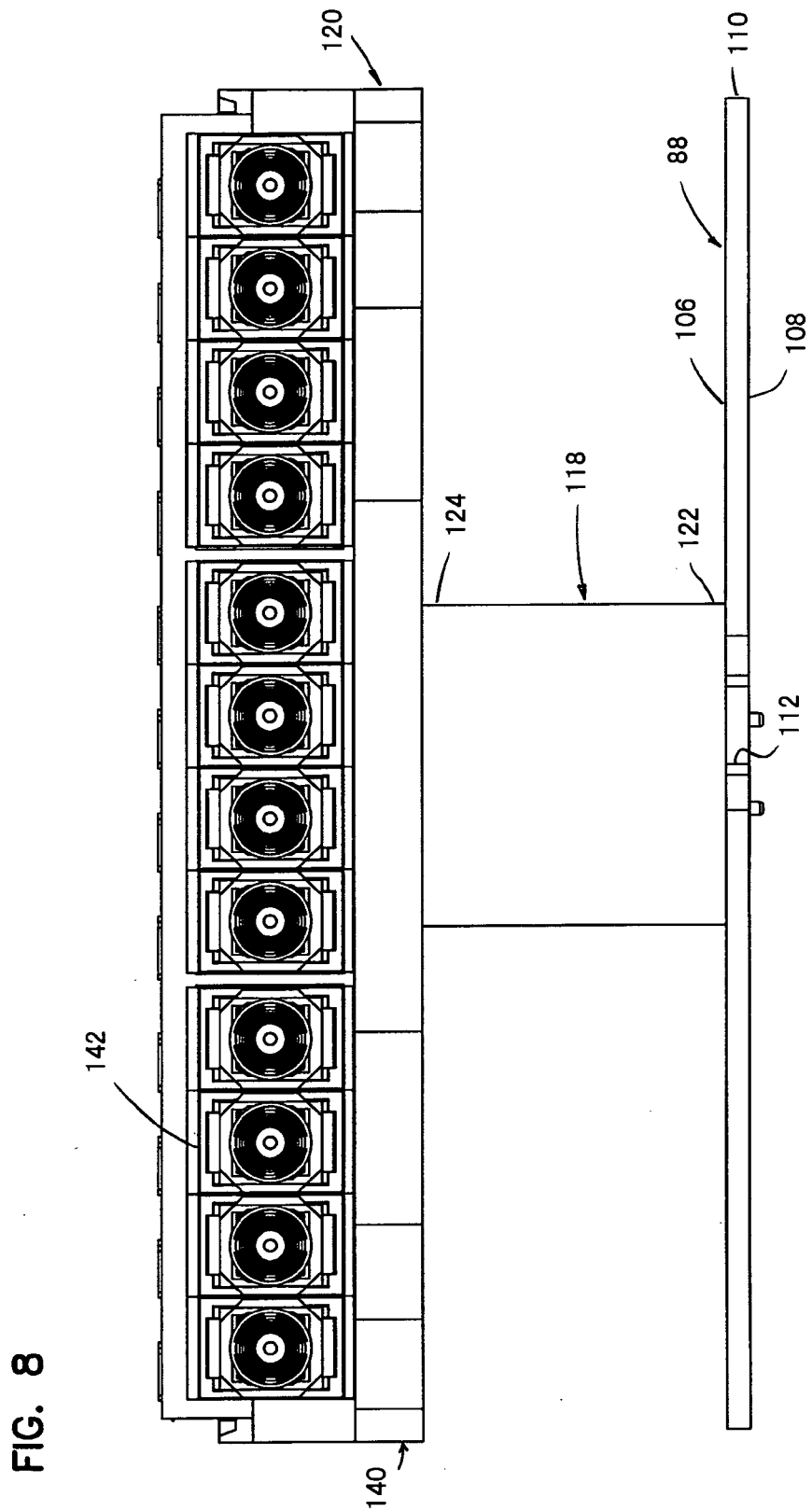
FIG. 8 is a side view of the cable spool assembly of FIG. 6.

In the depicted embodiment, the enclosure 12 includes a second cable slot 41 (shown in FIG. 5). The second cable slot 41 extends through the fourth sidewall 26 at a location that is adjacent to the first sidewall 20. The second cable slot 41 is adapted to provide an alternate location through which the distribution cable 36 can exit the interior region 28 of the enclosure 12.

In the depicted embodiment, the base 14 includes bend radius protectors 43 (shown in FIG. 5) disposed in the interior region 28 adjacent to the second cable slot 41. The bend radius protectors 43 are adapted to prevent attenuation damage to the distribution cable 36 as the distribution cable 36 is paid out from the second cable slot 41 of the enclosure 12.

The first sidewall 20 further defines a plurality of cable ports 42. In the depicted embodiment, the cable ports 42 are disposed at the first end 32 of the first sidewall 20 and include openings 44 along the first end 32. In the depicted embodiment, the cable ports 42 are aligned along a width W of the first sidewall 20.

A first seal 45a is disposed adjacent to the first sidewall 20. The first seal 45a extends the height of the first sidewall 20 and is adapted to environmentally seal the distribution cable 36 at the cable slot 30 and cable that passes through the cable ports 42. A second seal 45b is disposed adjacent to the fourth sidewall 26. The second seal 45b extends the height of the fourth sidewall 26 and is adapted to environmentally seal the distribution cable at the second cable slot 41 if the distribution cable 36 is routed through the second cable slot 41. In one embodiment, the first and second seals 45a, 45b are foam-type seals.

Referring now to FIGS. 1-5, the cover 16 is pivotally engaged to the base 14. The base 14 includes a plurality of projections 46 that is adapted to pivotally engage the cover 16 to the base 14. The third sidewall 24 of the base 14 includes a first projection 46a disposed at a corner of the third sidewall 24 that is adjacent to the base wall 18 and the second sidewall 22. The fourth sidewall 26 includes a second projection 46b disposed at a corner of the fourth sidewall 26 that is adjacent to the base wall 18 and the second sidewall 22. In the depicted embodiment, the first and second projections 46a, 46b extend outwardly from the third and fourth sidewalls 24, 26 and outwardly from the second sidewall 22. In the depicted embodiment, the first and second projections 46a, 46b are generally oblong in shape. Each of the first and second projections 46a, 46b has a length L1 and a width W1. The length L1 is greater than the width W1.

The base 14 further includes a plurality of detents 48 that is adapted to retain the cover 16 in a position relative to the base 14. The detents 48 are disposed along arcuate protrusions 50 that extend outwardly from the third and fourth sidewalls 24, 26. In the depicted embodiment, the arcuate protrusion 50 is a portion of a circle. The arcuate protrusions 50 are disposed adjacent to the corners of the third and fourth sidewalls 24, 26.

The cover 16 includes a first wall 52 and first and second sides 54, 56 that extend outwardly from the first wall 52. The first and second sides 54, 56 are generally perpendicular to the first wall 52. In the depicted embodiment, the first and second sides 54, 56 overlap a portion of the third and fourth sidewalls 24, 26 of the base 14 when the cover 16 is in a closed position.

The first and second sides 54, 56 of the cover 16 include receptacles 58 that are adapted to receive the first and second projections 46a, 46b of the base 14. The receptacles 58 include a side 60. The side 60 is configured so that the receptacle 58 is generally cylindrical in shape. The side 60 defines a passage 62 (best shown in FIG. 4) that extends through the side 60. The passage 62 is sized to receive the projection 46 laterally through the side 60 when the cover 16 is at a given angle α relative to the base 14. When the cover 16 is at disposed at the angle α relative to the base 14, the passage 62 is aligned with the projection 46 so that the projection 46 can be passed through the passage 62. In one embodiment, the angle α is less than about 45 degrees. In another embodiment, the angle α is between about 5 degrees and about 30 degrees. In another embodiment, the angle α is between about 5 degrees and about 25 degrees. In another embodiment, the angle α is about 15 degrees.

The cover 16 further includes a plurality of detent retention rails 64. In the depicted embodiment, each of the first and second sides 54, 56 of the cover 16 includes detent retention rails 64. The detent retention rails 64 define a channel 66 between the detent retention rails 64 that is sized to receive the plurality of detents 48 as the cover 16 is moved between the closed position and an open position.

Figure 3:
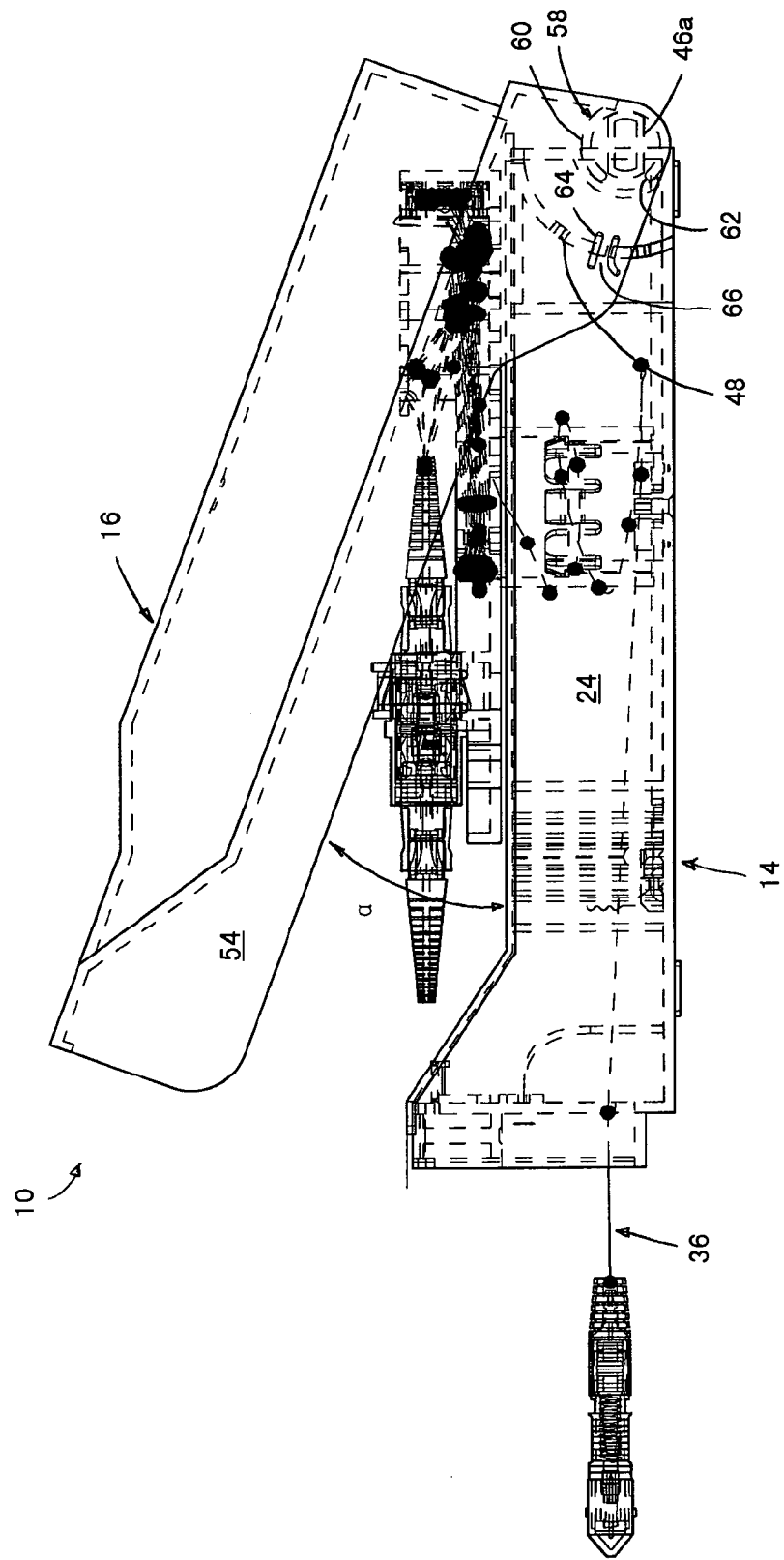
FIG. 3 is a side view of the fiber optic distribution terminal of FIG. 1 with the cover pivoted at an angle relative to a base.
Figure 4:
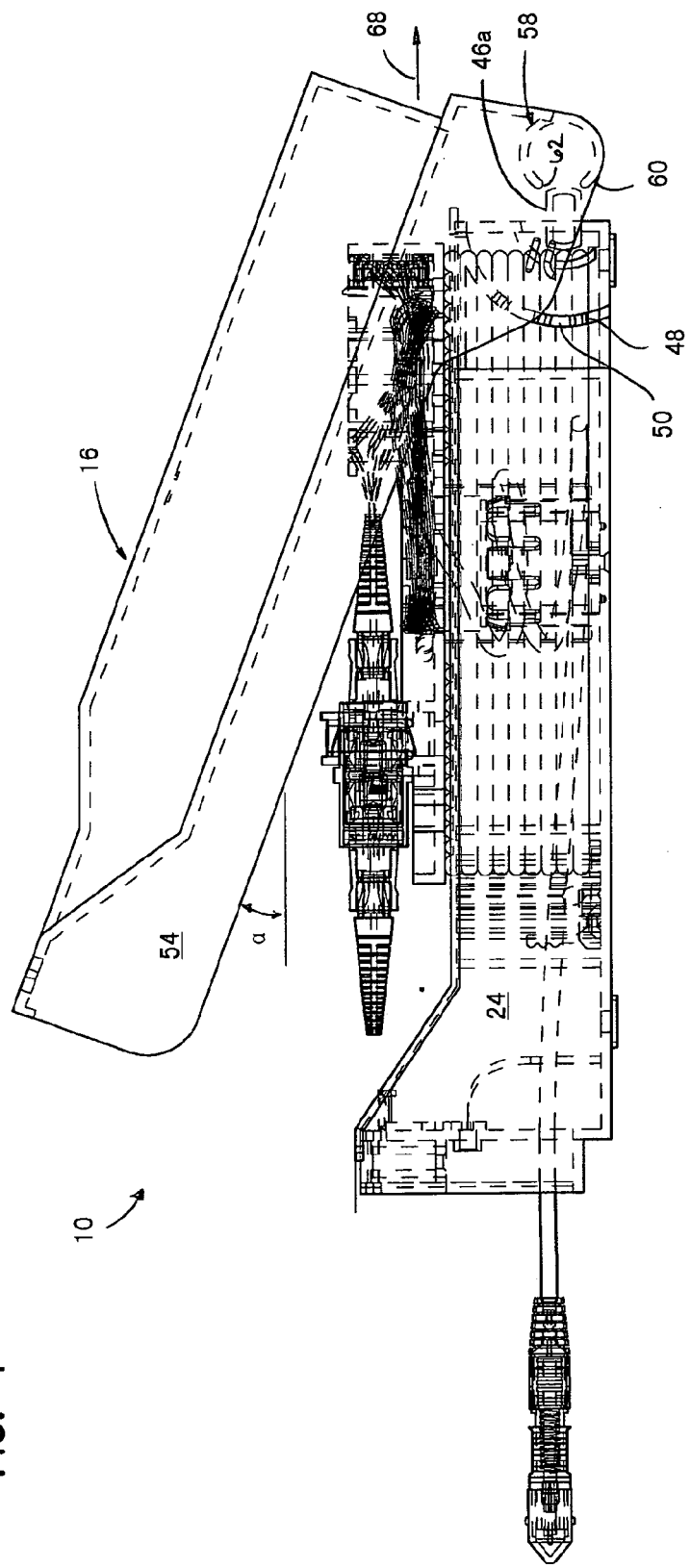
FIG. 4 is a side view of the fiber optic distribution terminal of FIG. 1 with the cover moved in a first direction relative to the base.

Referring now to FIGS. 1, 3 and 4, a method for removing the cover 16 from the base 14 will be described. With the cover 16 in the closed position (shown in FIG. 1), the cover 16 is pivoted about the first and second projection 46a, 46b of the base 14 to the angle α so that the passages 62 of the sides 60 of the receptacles 58 of the cover 16 are aligned with the first and second projections 46a, 46b of the base 14. With the passage 62 aligned with the first and second projections 46a, 46b, the cover 16 is slid in a first direction 68 (shown as an arrow in FIG. 4) away from the base 14 so that the first and second projections 46a, 46b pass through the passages 62 and are disengaged from the receptacles 58. With the first and second projections 46a, 46b disengaged with the receptacles 58, the cover 16 is lifted away from the base 14.

Referring now to FIGS. 2 and 5-11, the interior region 28 of the enclosure 12 includes a cable spool assembly 80. The cable spool assembly 80 is adapted to receive the distribution cable 36 so that the distribution cable 36 is coiled about the cable spool assembly 80. The cable spool assembly 80 includes a first flange 82 and a second flange 84.

The first flange 82 includes an inner drum 86 and a flange 88. The inner drum 86 is generally cylindrical in shape and defines an inner bore 89. The inner drum 86 includes a first axial end portion 90 and a second axial end portion 92. The first axial end portion 90 includes a plurality of resilient tabs 94. Each of the resilient tabs 94 includes a base end 96 and a free end 98. The base end 96 is engaged with the inner drum 86. The free end 94 extends outwardly from the base end 96 in a direction that is generally parallel to a longitudinal axis 100 of the inner drum 86. The free end 98 includes a lip protrusion 102 that extends outwardly from the free end 98. The lip protrusion 102 includes a lip 104.

The second axial end portion 92 of the inner drum 86 is engaged to the flange 88. In one embodiment, the inner drum 86 and the flange 88 are integral.

The flange 88 is generally circular in shape. In the depicted embodiment, the flange 88 has an outer diameter that is greater than the outer diameter of the inner drum 86. The flange 88 includes a first surface 106 and an oppositely disposed second surface 108 and an outer edge 110 that extends between the first and second surfaces 106, 108 at a periphery of the flange 88. The inner drum 86 extends outwardly from the first surface 106 in a direction that is generally perpendicular to the flange 88.

The flange 88 further includes a notch 112. The notch 112 extends radially inward from the outer edge 110 of the flange 88. The notch 112 extends through the first and second surfaces 106, 108.

The flange 88 further includes a plurality of openings 114 that extend through the first and second surface 106, 108. The openings 114 are disposed immediately adjacent to an outer surface 116 of the inner drum 86.

The second flange 84 includes an outer drum 118 and a tray assembly 120. In the depicted embodiment, the distribution cable 36 is coiled about the outer drum 118 of the second flange 84. The outer drum 118 includes a first axial end 122 and an oppositely disposed second axial end 124 and defines a bore 126 that extends through the first and second axial ends 122, 124.

The first axial end 122 includes a plurality of tabs 128. The tabs 128 extend outwardly from the first axial end 122 in a direction that is generally parallel to a central longitudinal axis 130 of the outer drum 118. The tabs 128 are adapted for receipt in the openings 114 of the flange 88 of the first flange 82. The engagement of the tabs 128 of the second flange 84 and the openings 114 of the first flange 82 is adapted to prevent rotation of the first flange 82 relative to the second flange 84.

The bore 126 of the outer drum 118 of the second flange 84 is sized to receive the inner drum 86 of the first flange 82. In the depicted embodiment, the inner and outer drums 86, 118 are adapted for snap-fit engagement. The outer drum of the second flange 84 includes a ledge 132 disposed in the bore 126 between the first axial end 122 and the second axial end 124. The ledge 132 is adapted to abut the lip 104 of the free end 98 of the resilient tabs 94 of the inner drum 86 when the inner drum 86 is disposed in the bore 126 of the outer drum 118.

To engage the inner and outer drums 86, 118, the openings 114 of the flange 88 of the first flange 82 are aligned with the tabs 128 on the first axial end 122 of the outer drum 118 of the second flange 84. The first axial end portion 90 of the inner drum 86 is inserted into the bore 126 at the first axial end 122 of the outer drum 118. As the inner drum 86 is inserted, the free ends 98 of the resilient tabs 94 flex inwardly. When the lip 104 passes the ledge 132 in the bore 126, the resilient tabs 94 snap outwardly. The first and second flanges 82, 84 are held together by the abutment of the lip 104 of the inner drum 86 and the ledge 132 of the outer drum 118.

Referring now to FIGS. 5-7, 12 and 13, the tray assembly 120 will be described. The tray assembly 120 includes a tray 140 and a plurality of adapters 142.

In the depicted embodiment, the tray 140 is generally rectangular in shape. The tray 140 includes a base wall 144 that is generally parallel to the flange 88 of the first flange 82 when the first and second flanges 82, 84 are engaged. The base wall 144 of the tray 140 defines a cable passage 146 that extends through the base wall 144. The cable passage 146 provides a path through which distribution cable 36 that is disposed about the outer drum 118 of the second flange 84 of the cable spool assembly 80 can pass through the base wall 144.

The tray 140 includes a fanout mount 148. In the depicted embodiment, the fanout mount 148 includes a resilient tab 150 and a plurality of holders 152 that extend outwardly from the base wall 144 of the tray 140 in a generally perpendicular direction. The resilient tab 150 includes a lip portion 154 that is adapted to abut a side edge 156 of a fanout 158. The holders 152 are adapted to receive corners of the fanout 158 to retain the fanout 158 in position.

The distribution cable 36 is routed to the fanout 158 in the fanout mount 148 after passing through the cable passage 146 in the base wall 144 of the tray 140. The fanout 158 separates the distribution cable 36 into individual optical fibers.

The optical fibers of the distribution cable 36 are then routed to a plurality of bend radius protectors 159. The bend radius protectors 159 are disposed on the tray 140 to form a cable routing loop 161 (best shown in FIG. 21). The cable routing loop 161 is adapted to store an excess length of the optical fibers of the distribution cable 36. In the depicted embodiment, the cable passage 146 is disposed within the cable routing loop 161.

A plurality of cable management spools 160 is disposed on the tray 140 inside the cable routing loop 161 and adjacent to the fanout mount 148. The cable management spools 160 are adapted to route the optical fibers of the distribution cable 36 from the cable routing loop 161 to a termination region 163 of the tray 140.

The termination region 163 of the tray 140 includes an adapter bracket mount 162. In the depicted embodiment, the tray 140 includes a first adapter bracket mount 162a and a second adapter bracket mount 162b. The first and second adapter bracket mounts 162a, 162b are resilient tabs that extend outwardly from the base wall 144 in a generally perpendicular direction. Each of the resilient tabs includes a free end 164 having a lip 166 that is adapted to engage an adapter bracket assembly 168 (shown in FIG. 5).

Referring now to FIGS. 5 and 14-19, the adapter bracket assembly 168 is shown. The adapter bracket assembly 168 includes a bracket 170 having a first end 172 and an oppositely disposed second end 174. Each of the first and second ends 172, 174 include a notch 176 that is adapted to receive the lip 166 of the free end 164 of the bracket mount 162 of the tray 170.

The bracket 170 defines a plurality of adapter openings 178. The adapter openings 178 are adapted to receive adapters 142. In the depicted embodiment of FIG. 14, there are twelve adapters 142 of the SC-type. In the depicted embodiment of FIG. 15, there are twelve adapters 142 of the LC-type. In the depicted embodiment of FIG. 16, there are four adapters 142 of the dual LC-type. In the depicted embodiment of FIG. 17, there are eight adapters 142 of the LC-type. In the depicted embodiment of FIG. 18, there are two adapters 142 of the dual LC-type. In the depicted embodiment of FIG. 19, there are four adapters 142 of the LC-type.

Each of the adapters 142 includes a first port 182 and an oppositely disposed second port 184. The first port 182 is adapted to receive connectorized ends 186 (shown in FIG. 5) of optical fibers of the distribution cable 36 while the second port 184 is adapted to receive connectorized ends 188 (shown in FIG. 5) of subscriber cables that are routed from the enclosure 12 to a subscriber location such as a subscriber premise.

Referring now to FIG. 5, with the adapter bracket assembly 168 engaged in the first and second adapter bracket mounts 162a, 162b, the optical fibers of the distribution cable 36 are routed from the fanout 158 to the cable management spools 160. The optical fibers are then routed to the first ports 182 of the adapters 142 disposed in the bracket 170.

Figure 9:
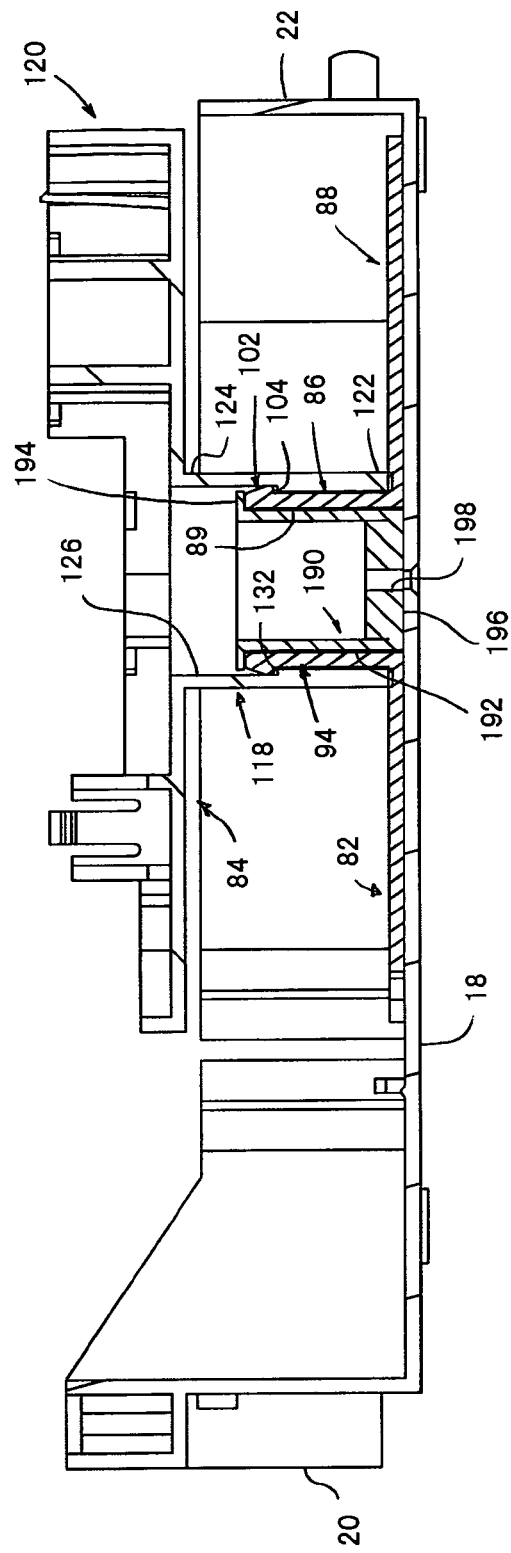
FIG. 9 is a cross-sectional view of the fiber optic distribution terminal of FIG. 2.
Figure 10:
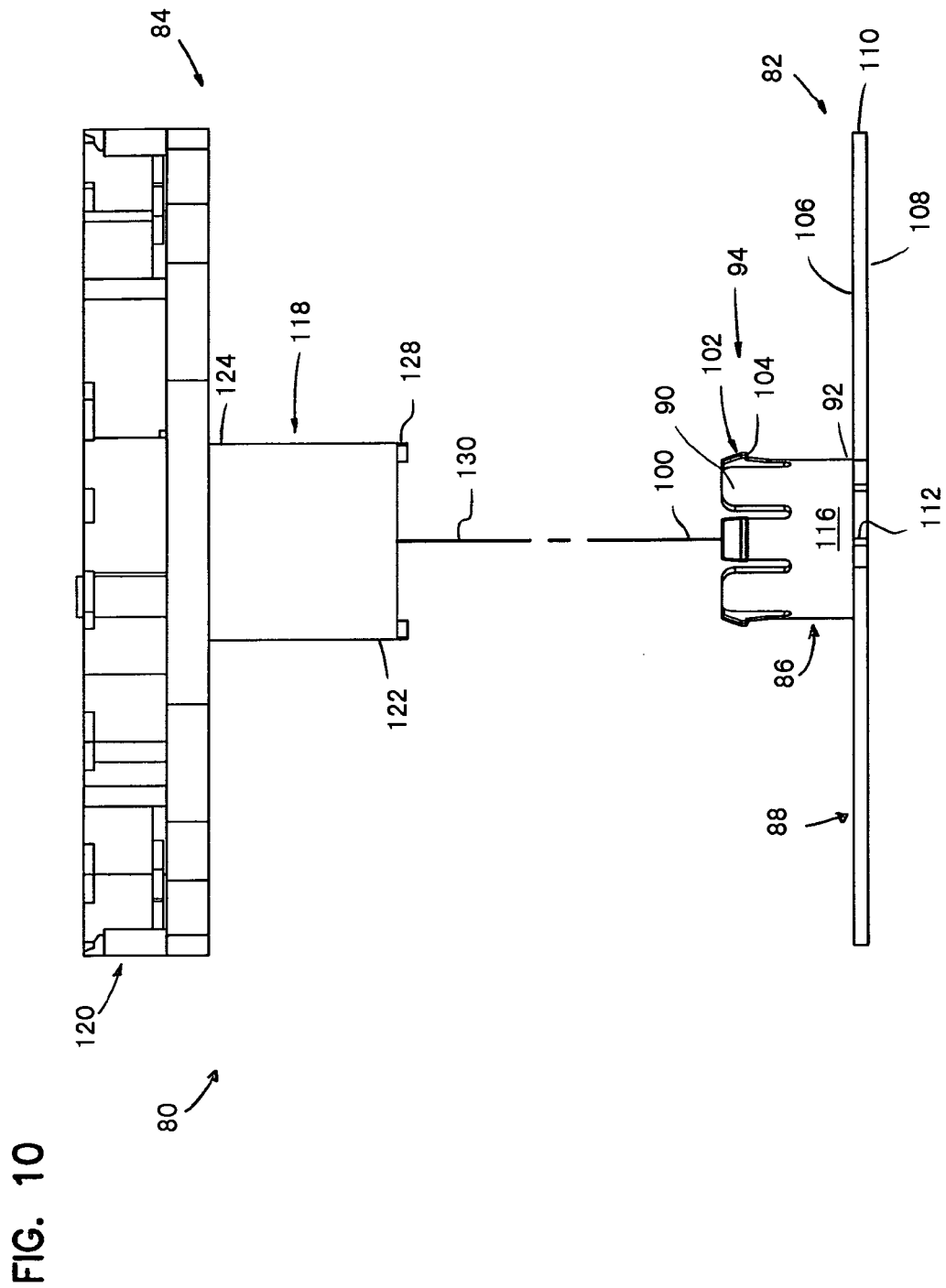
FIG. 10 is an exploded view of the cable spool assembly of FIG. 6.
Figure 11:
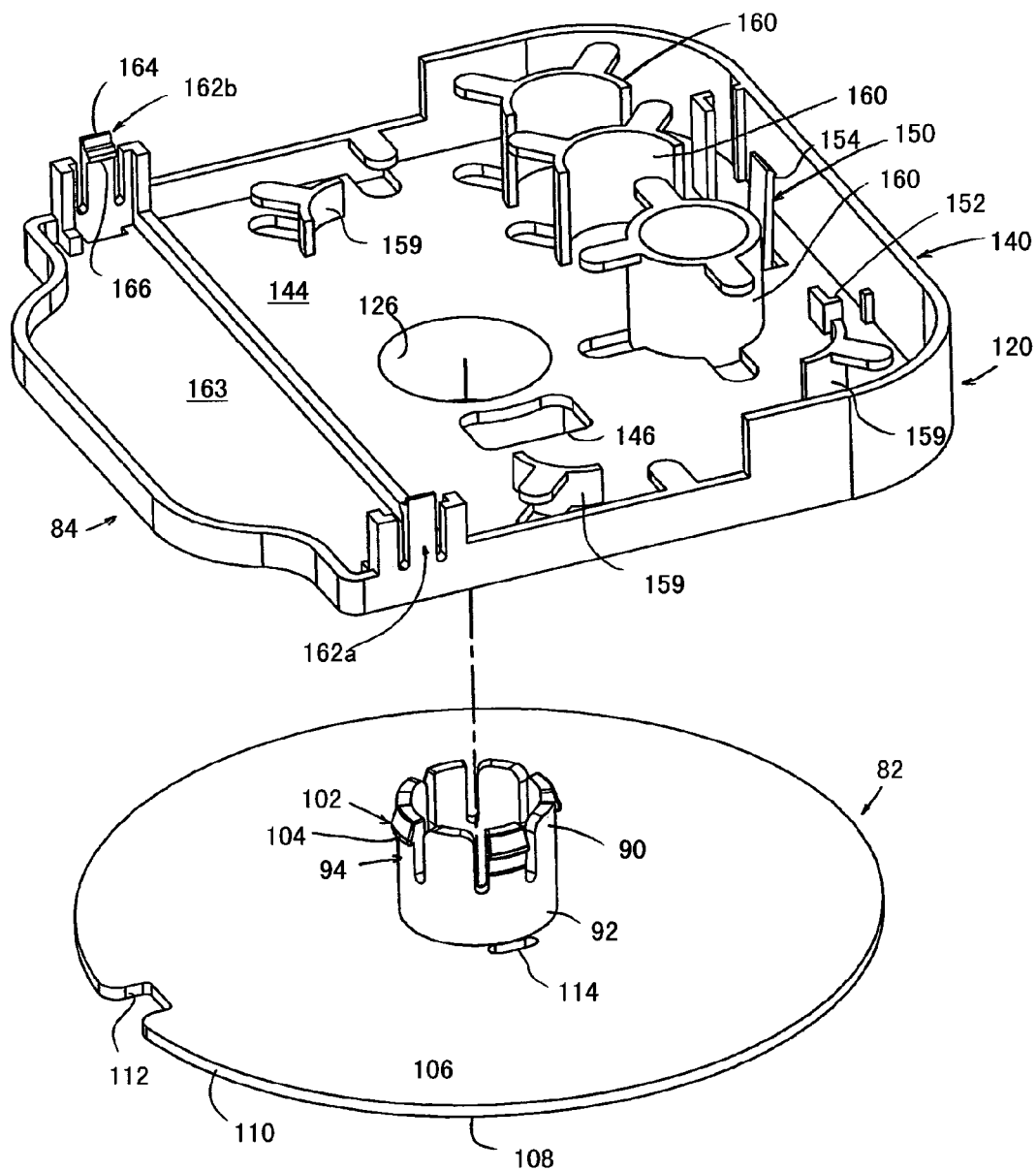
FIG. 11 is an exploded perspective view of the cable spool assembly of FIG. 10.
Figure 12:
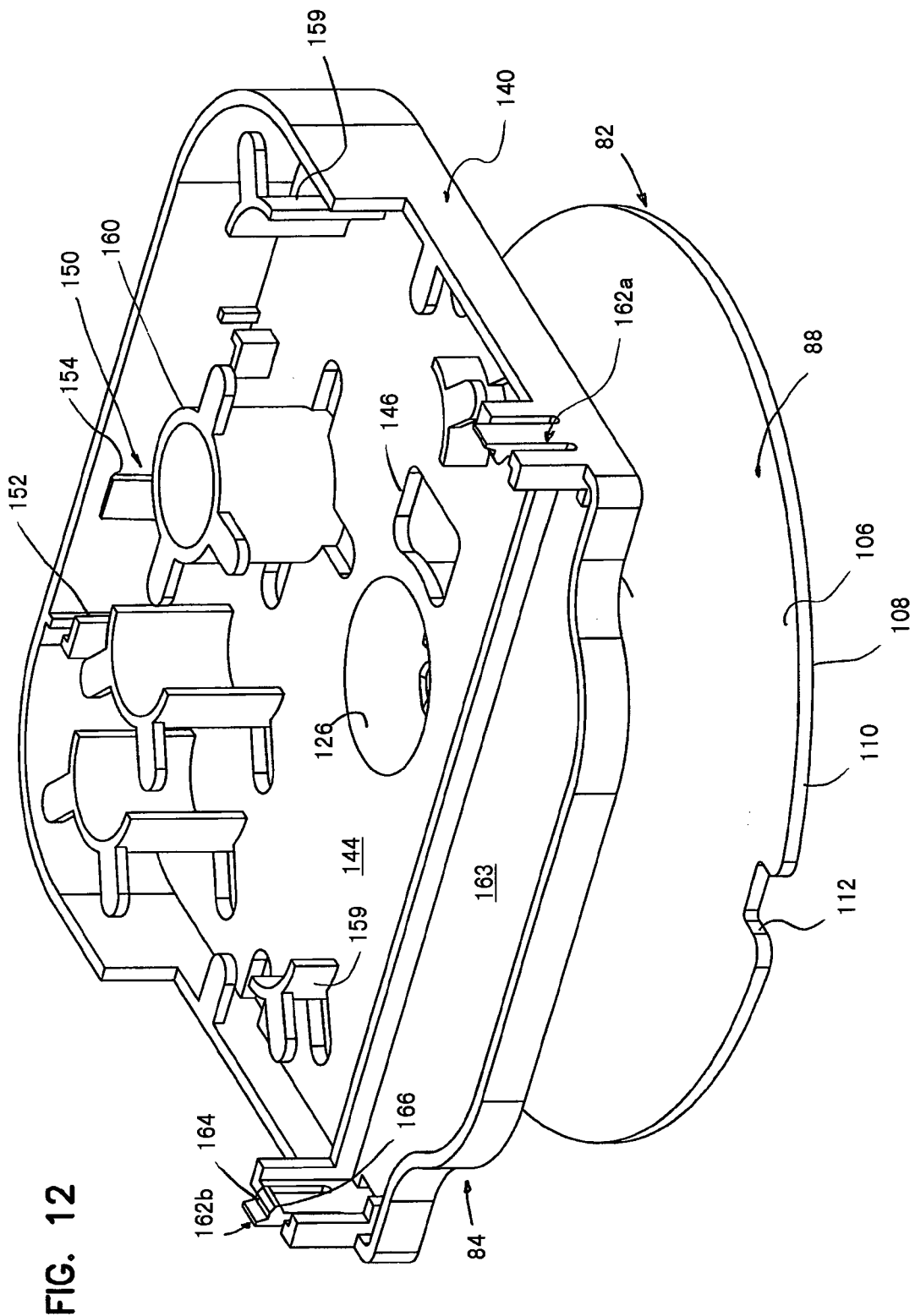
FIG. 12 is a perspective view of the cable spool assembly of FIG. 6.
Figure 13:
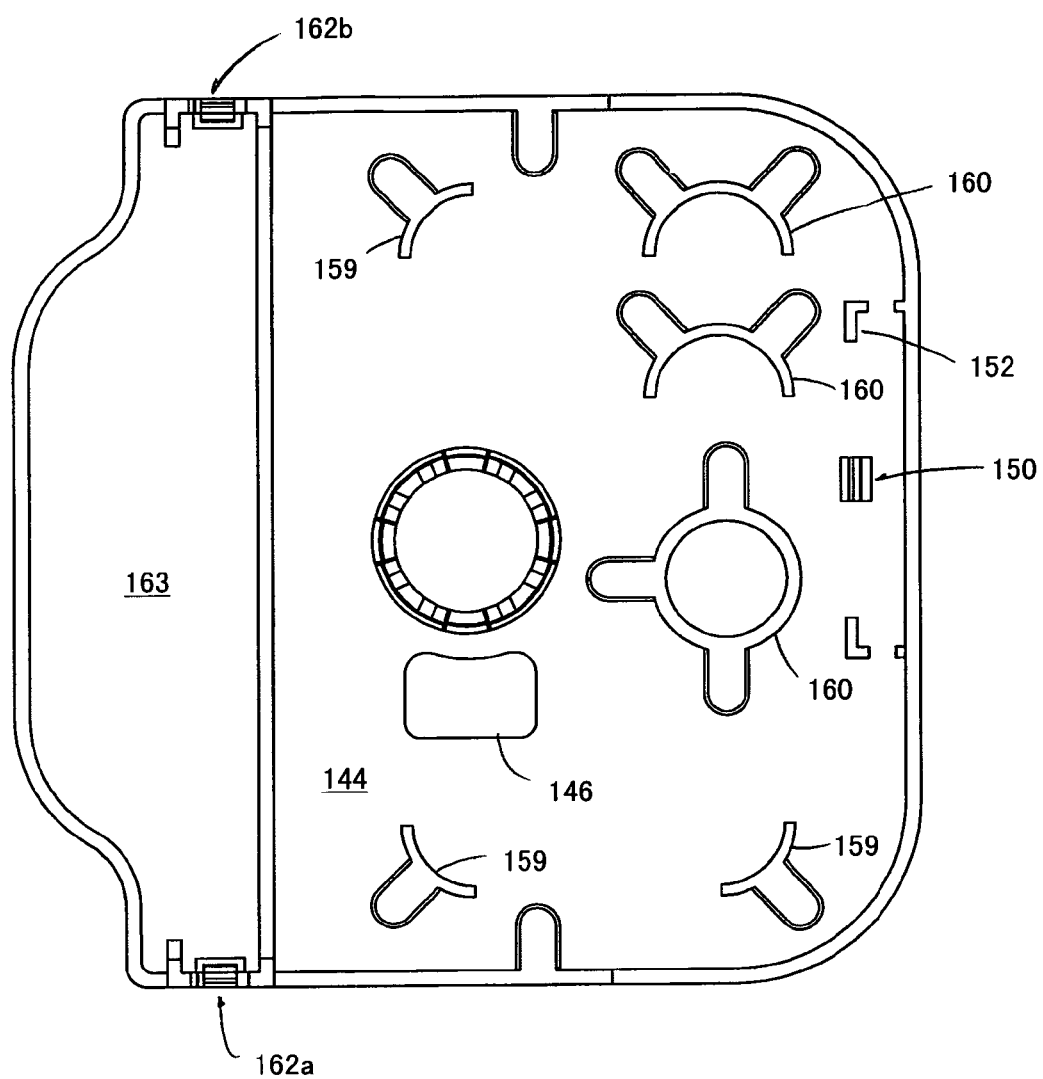
FIG. 13 is a top view of the cable spool assembly of FIG. 6.
Figure 14:
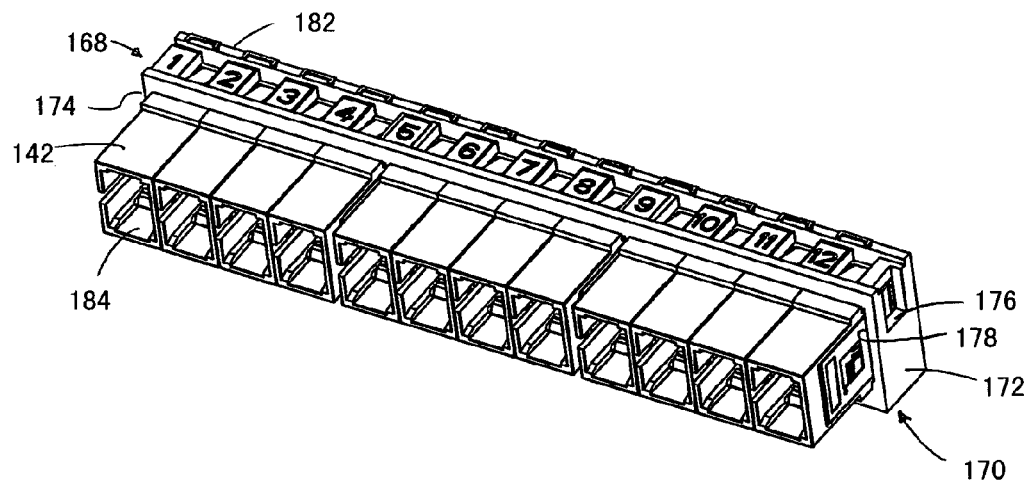
FIG. 14 is a perspective view of an adapter bracket assembly suitable for use with the cable spool assembly of FIG. 6.
Figure 15:
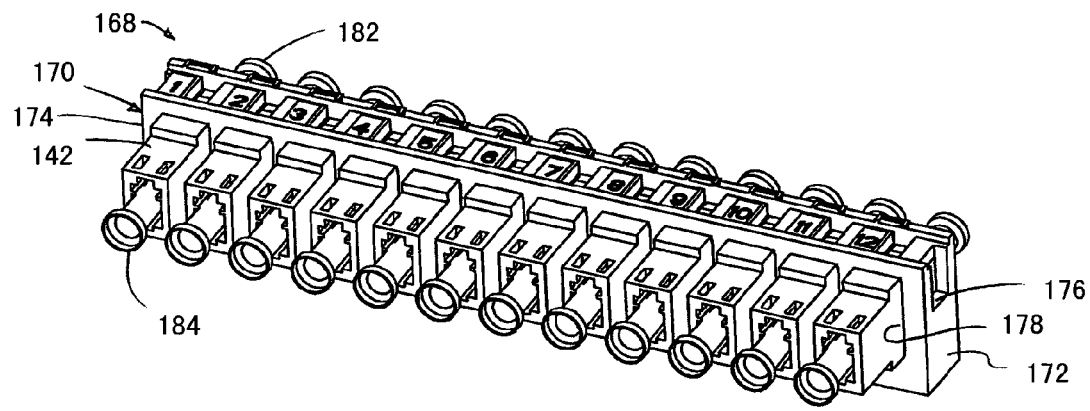
FIG. 15 is a perspective view of an alternate embodiment of an adapter bracket assembly suitable for use with the cable spool assembly of FIG. 6.
Figure 16:
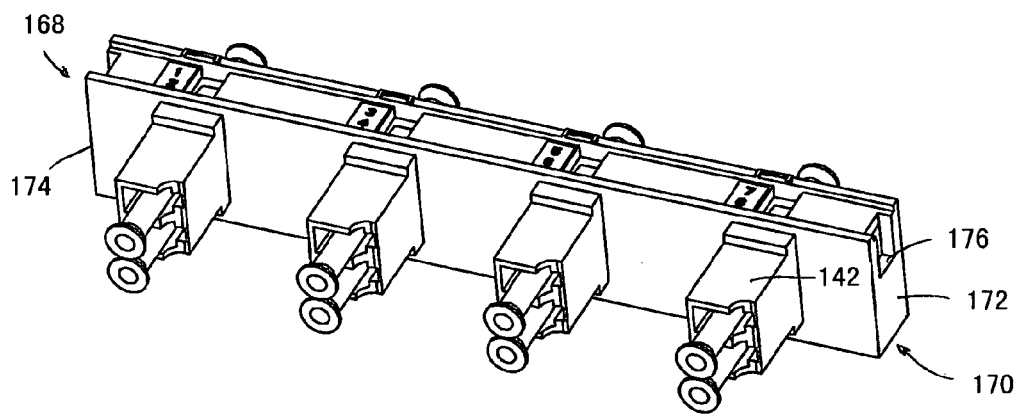
FIG. 16 is a perspective view of an alternate embodiment of an adapter bracket assembly suitable for use with the cable spool assembly of FIG. 6.
Figure 17:
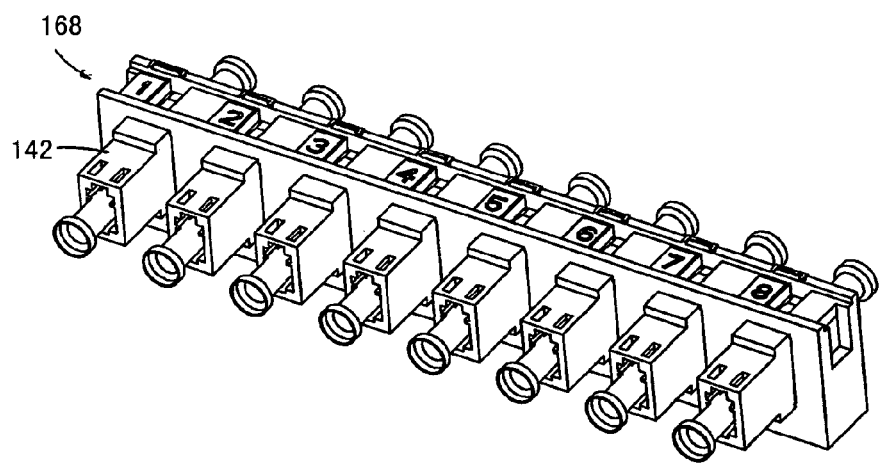
FIG. 17 is a perspective view of an alternate embodiment of an adapter bracket assembly suitable for use with the cable spool assembly of FIG. 6.
Figure 18:
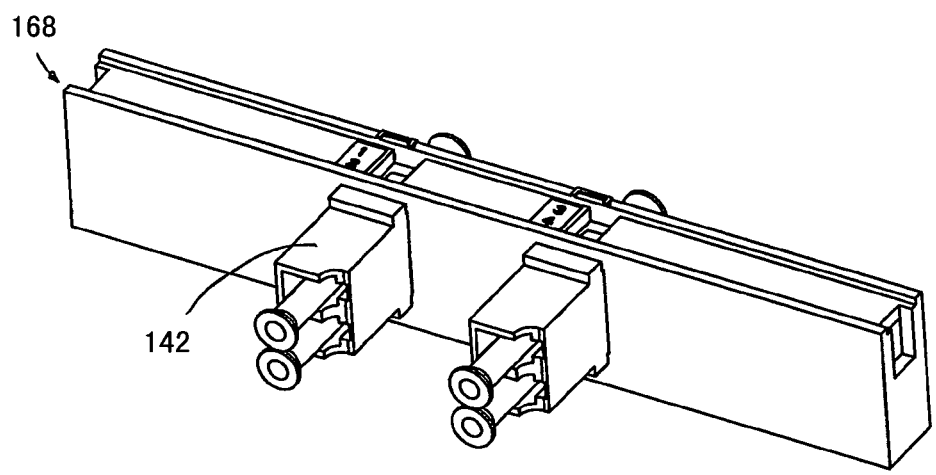
FIG. 18 is a perspective view of an alternate embodiment of an adapter bracket assembly suitable for use with the cable spool assembly of FIG. 6.
Figure 19:
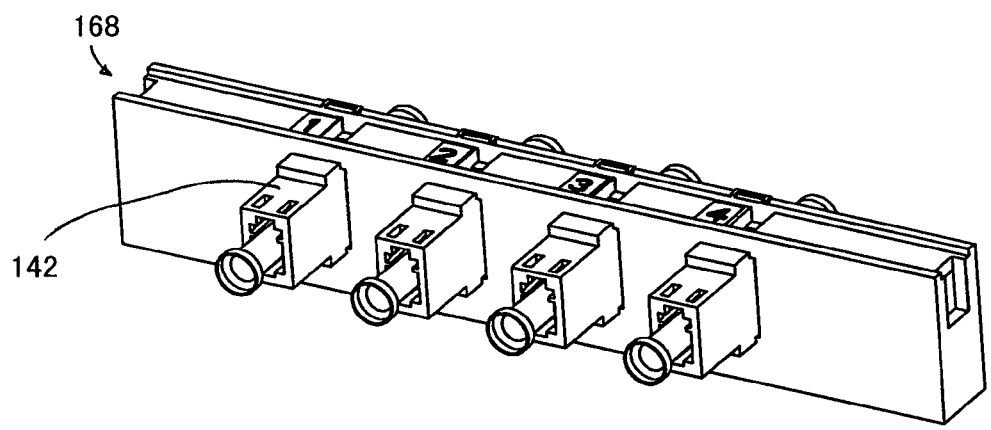
FIG. 19 is a perspective view of an alternate embodiment of an adapter bracket assembly suitable for use with the cable spool assembly of FIG. 6.
Figure 20:
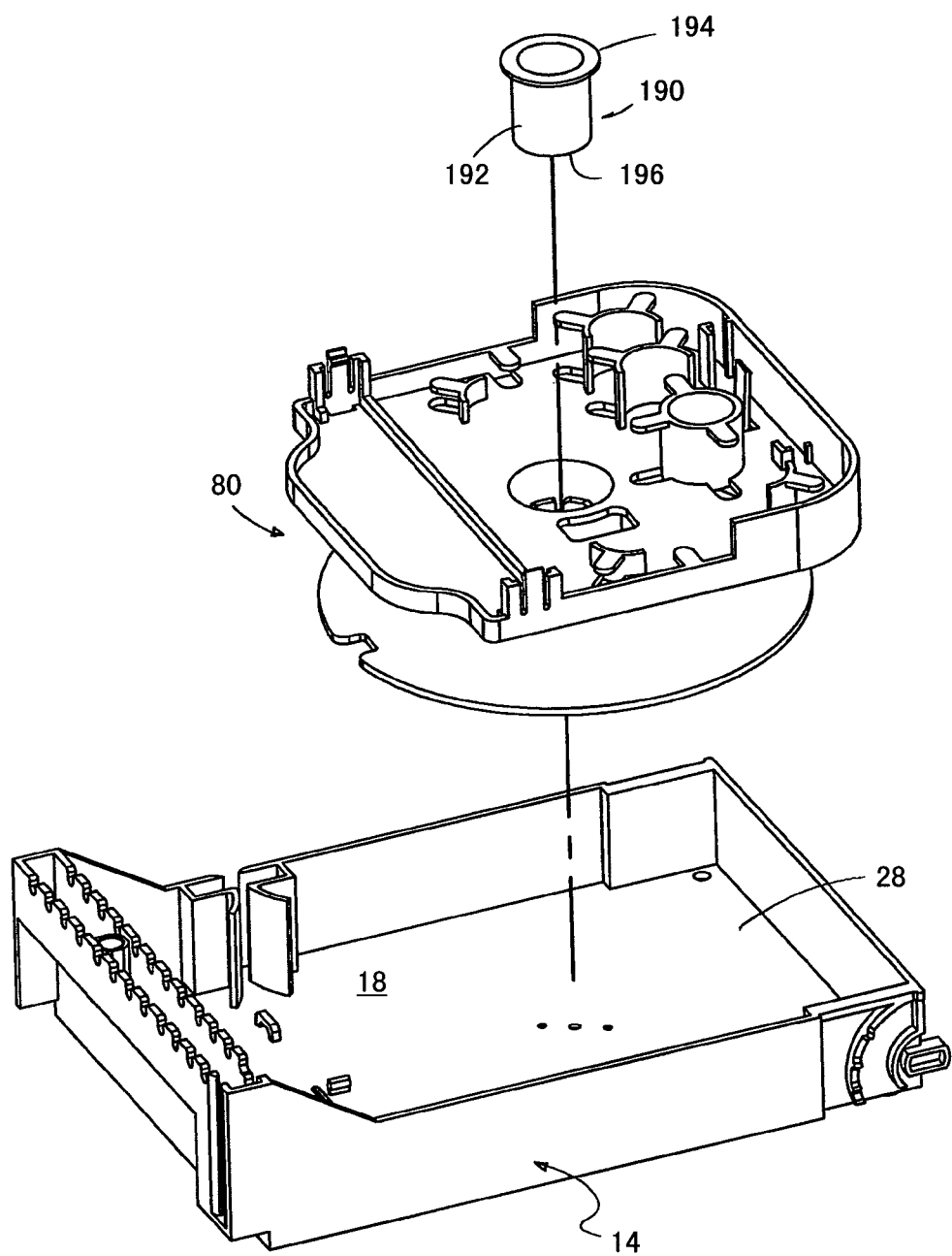
FIG. 20 is an exploded view of the fiber optic distribution terminal.

Referring now to FIGS. 5, 9 and 20, the engagement of the cable spool assembly 80 to the base 14 will be described. The cable spool assembly 80 is engaged to the base 14 so that the cable spool assembly 80 can rotate within the interior region 28 of the enclosure 12. In the depicted embodiment, a bushing 190 provides the engagement between the cable spool assembly 80 and the base wall 18 of the base 14.

The bushing 190 is generally cylindrical in shape. The bushing 190 includes a first axial end 192 and a second axial end 194. The first axial end 192 of the bushing 190 includes an end surface 196 (shown in FIG. 9). The end surface 196 is adapted for abutment with the base wall 18 of the base 14. The end surface 196 defines a hole 198 that extends through the end surface 196. The hole 198 is adapted to receive a fastener (e.g., screw, bolt, etc.).

The first axial end 192 has an outer diameter that is less than the inner diameter of the inner bore 89 of the inner drum 86 so that the first axial end 192 of the bushing 190 can be inserted into the inner bore 89 of the inner drum 86. The second axial end 194 has an outer diameter that is greater than the inner diameter of the inner bore 89 of the inner drum 86 but less than an inner diameter of the bore 126 of the outer drum 118. With the first axial end 192 of the bushing 190 disposed in the inner bore 89 of the inner drum 86 and the fastener engaging the end surface 196 to the base wall 18, the second axial end 194 abuts the free end 98 of the resilient tabs 94 of the first flange 82 and secures the engagement of the cable spool assembly 80 and the base wall 18. As the bushing 190 is generally cylindrical in shape, the cable spool assembly 80 can rotate about the bushing 190.

Figure 21:
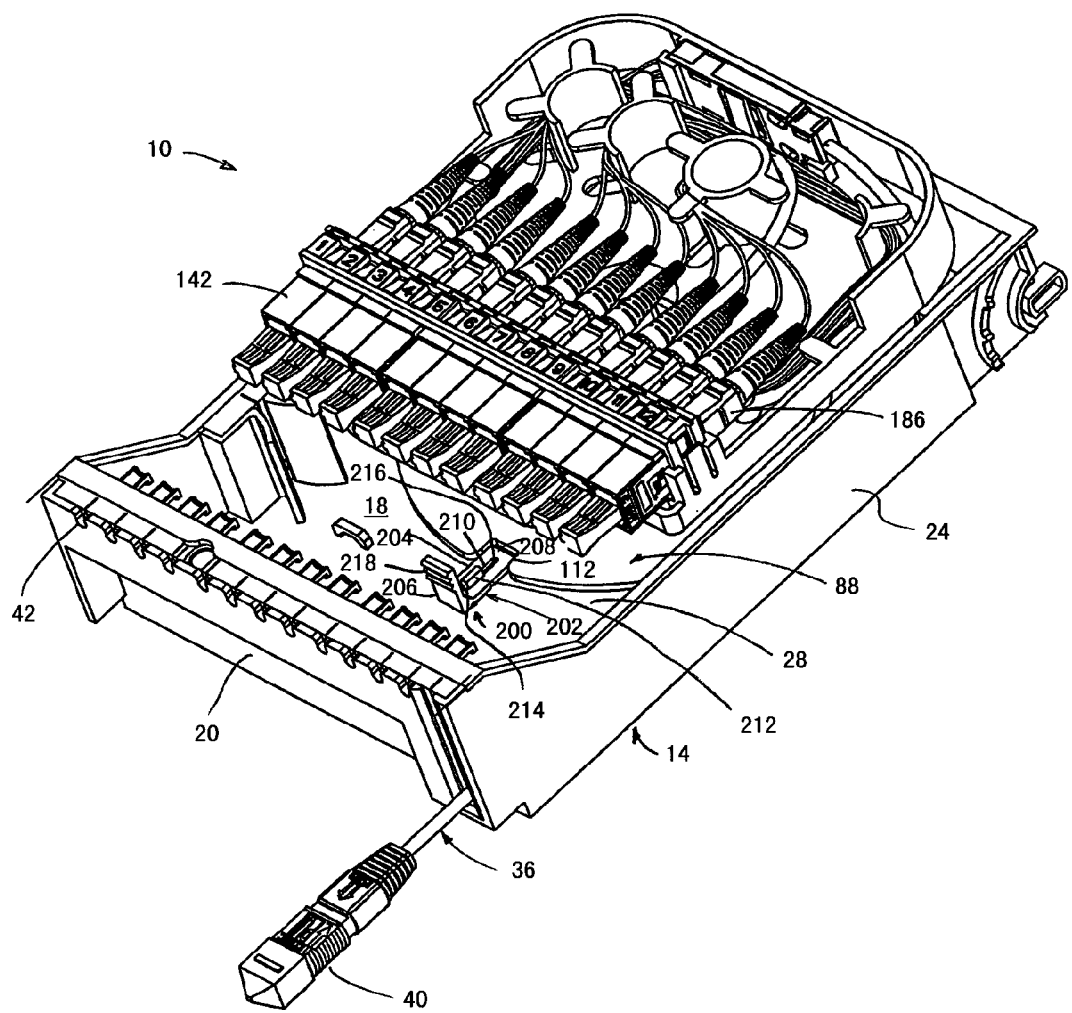
FIG. 21 is a perspective view of the fiber optic distribution terminal.
Figure 22:
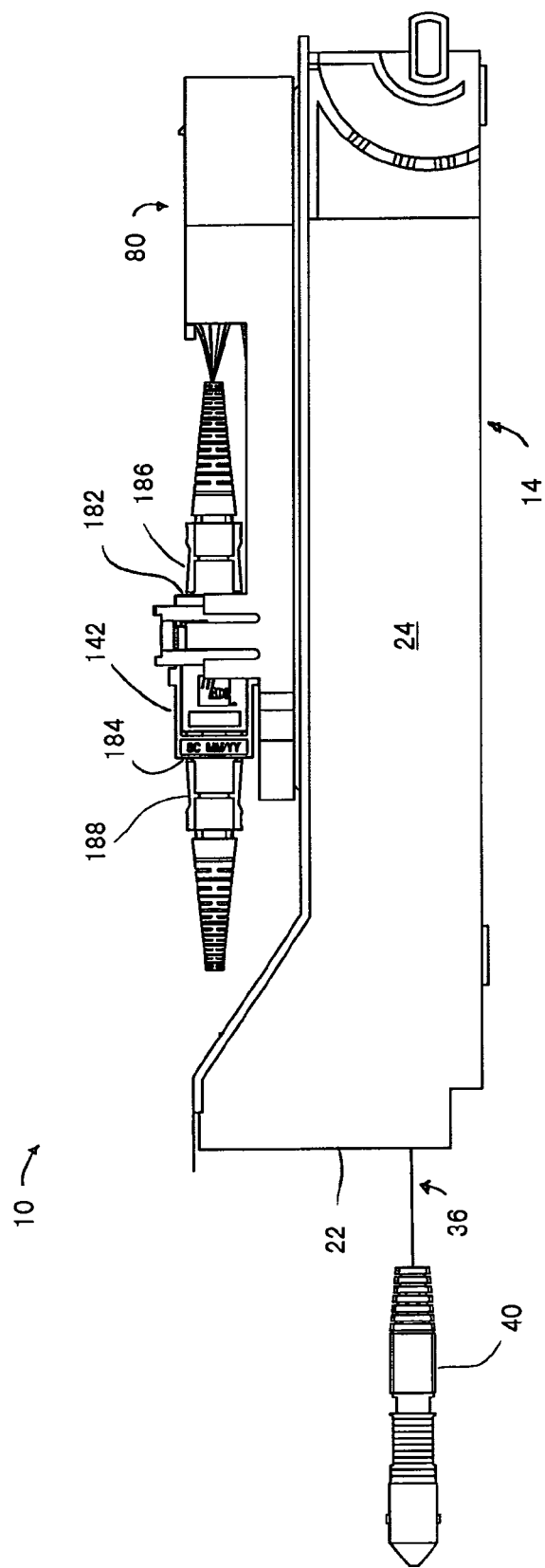
FIG. 22 is a side view of the fiber optic distribution terminal.

Referring now to FIGS. 2 and 21, a locking mechanism 200 will be described. The locking mechanism 200 is adapted to prevent rotation of the cable spool assembly 80. The locking mechanism 200 is adapted to slide along the base wall 18 of the base 14.

The locking mechanism 200 includes a body 202 having an engagement portion 204 and a handle portion 206. In the depicted embodiment, the handle portion 206 is generally perpendicular to the engagement portion 204.

The engagement portion 204 includes a first end 208. The first end 208 is adapted for engagement with the notch 112 of the first flange 82.

The engagement portion 204 defines a guide slot 210. The guide slot 210 is adapted to receive a guide 212 that extends outwardly from the base wall 18 of the base 14. A length of the guide slot 210 is generally greater than a length of the guide 212 so that the locking mechanism 200 is slidable between an engaged position (Shown in FIG. 21) and a disengaged position. The guide slot 210 includes a first axial end 214 and an oppositely disposed second axial end 216. In the engaged position, the guide 212 of the base wall 18 abuts the first axial end 214 of the guide slot 210 so that the first end 208 of the engagement portion 204 is disposed in the notch 112 of the first flange 82. In the disengaged position, the guide 212 abuts the second axial end 216 of the guide slot 210 so that the first end 208 of the engagement portion 204 is disengaged from the notch 112.

The handle portion 206 includes a gripping portion 218. In the depicted embodiment, the gripping portion 218 is a plurality of ribs that extends across the handle portion 206.

Referring now to FIGS. 2-5, 21 and 22, a method for deploying the distribution cable 36 will be described. With the cover 16 removed from the base 14 using the method previously described and with the locking mechanism 200 in the disengaged position, the distribution cable 36 can be deployed from the cable spool assembly 80 by pulling on the distribution cable 36. As the distribution cable 36 is pulled, the cable spool assembly 80 rotates about the bushing 190. As the adapters 142 are engaged to the tray 140, which rotates in unison with the cable spool assembly 80, the connectorized ends 186 of the optical fibers of the distribution cable 36 can be engaged to the first ports 182 of the adapters 142 while the distribution cable 36 is being paid out from the cable spool assembly 80.

After the distribution cable 36 has been paid out from the cable spool assembly 80, the connectorized ends 188 of subscriber cables can be engaged to the second ports 184 of the adapters 142. In order to prevent the cable spool assembly 80 from moving during installation of the connectorized ends 188 of the subscriber cables into the second ports 184 of the adapters 142, the notch 112 of the first flange 82 is aligned with the engagement portion 204 of the locking mechanism 200. When the notch 112 of the first flange 82 is aligned with the engagement portion 204, the locking mechanism 200 is manually actuated to the engaged position so that the first end 208 of the engagement portion 204 is disposed in the notch 112 of the first flange 82.

With the locking mechanism 200 in the engaged position, the adapter bracket assembly is generally parallel to the first sidewall 20. In one embodiment, the second ports 184 of the adapters 142 are generally aligned with the cable ports 42 of the first sidewall 20 of the base 14.

As previously provided, the flange 88 of the first flange 82 is generally circular in shape while the tray 140 of the second flange 84 is generally rectangular in shape. In the depicted embodiment, the width of the tray 140 is slightly smaller than the width of the interior region 28 of the enclosure 12. The base wall 144 of the tray 140 is offset from the base wall 18 of the base 14 by a first height. The first height is greater than the height of the second, third and fourth sidewalls 22, 24, 26 of the base 14. Therefore, with the cover 16 engaged to the base 14, the cable spool assembly 80 is prevented from rotating by the abutment of the tray 140 with the cover 16. With the cover 16 removed and the locking mechanism 200 in the disengaged position, the cable spool assembly 80 can freely rotate as the tray 140 is disposed at an offset height that is greater than the height of the base 14.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic distribution terminal comprising:
    an enclosure having:
        a base having a base wall and a plurality of sidewalls that extend outwardly from the base wall;
        a cover pivotally engaged to the base, the base and the cover cooperatively defining an interior region;
    a cable spool assembly disposed in the interior region of the enclosure, the cable spool assembly including:
        a first flange having a flange and an inner drum that extends outwardly from the flange;
        a second flange having a tray and an outer drum that extends outwardly from the tray, the outer drum defining a bore, wherein the outer drum is in snap-fit engagement with the inner drum;
        a plurality of adapters disposed on the tray, the plurality of adapters defining a first port and an oppositely disposed second port; and
    a fiber optic cable disposed about the outer drum of the cable spool assembly, the fiber optic cable including a plurality of connectorized ends that is engaged with the first ports of the plurality of adapters.

2. The fiber optic distribution terminal of claim 1, further comprising a locking mechanism slidably engaged with the base wall of the enclosure, the locking mechanism being adapted to prevent rotation of the cable spool assembly.

3. The fiber optic distribution terminal of claim 2, wherein the first flange defines a notch that is adapted to receive the locking mechanism.

4. The fiber optic distribution terminal of claim 1, wherein the plurality of sidewalls of the base includes a first sidewall, an oppositely disposed second sidewall, a third sidewall that extends between the first and second sidewalls and an oppositely disposed fourth sidewall.

5. The fiber optic distribution terminal of claim 4, wherein the third and fourth sidewalls include first and second projections, respectively, that extend outwardly from the third and fourth sidewalls.

6. The fiber optic distribution terminal of claim 5, wherein the first and second projections are generally oblong in shape.

7. The fiber optic distribution terminal of claim 5, wherein the cover includes a plurality of receptacles that is adapted to receive the first and second projections, each of the receptacles including a sidewall that defines a passage, through which the projections can pass.

8. The fiber distribution terminal of claim 4, wherein the base includes a plurality of detents that is adapted to retain the cover in a position.

9. The fiber distribution terminal of claim 1, wherein the flange of the first flange is generally circular in shape and the tray is generally rectangular in shape.

10. The fiber distribution terminal of claim 9, wherein the tray abuts the cover when the cover is in the closed position to prevent the cable spool assembly from rotating.

11. A method of deploying a fiber distribution cable, the method comprising:
    removing a cover of an enclosure from a base of the enclosure;
    disengaging a locking mechanism disposed in an interior region of the enclosure from a first flange of a cable spool assembly disposed in the interior region of the enclosure, the first flange having a flange and an inner drum that extends outwardly from the flange;
    pulling an end of a fiber distribution cable extending from a cable slot of the enclosure so that the cable spool assembly including the first flange and a second flange disposed in the interior region of the enclosure rotates, the second flange including a tray assembly including a tray, the tray being disposed at an offset height from the base that is greater than a height of the base, an outer drum that extends outwardly from the tray, the outer drum defining a bore, wherein the outer drum is in snap-fit engagement with the inner drum, and a plurality of fiber optic adapters disposed on the tray;
    engaging the locking mechanism and the first flange of the cable spool assembly; and
    installing the cover to the base, wherein when the cover is engaged to the base the spool assembly is prevented from rotating by abutment of the tray with the cover, and wherein when the cover is removed and the locking mechanism is disengaged the cable spool assembly can freely rotate to allow the fiber distribution cable to be paid out from a cable slot of the enclosure.

12. The method of claim 11, wherein the cover is removed by pivoting the cover to an angle relative to the base and sliding the cover in a first direction away from the base.

13. The method of claim 12, wherein the angle is less than or equal to about 45 degrees.

14. The method of claim 12, wherein the angle is between about 5 degrees and about 30 degrees.

15. The method of claim 12, wherein the angle is about 15 degrees.

16. The method of claim 11, wherein the fiber distribution cable includes connectorized ends engaged with first ports of adapters disposed on the cable spool assembly.

17. The method of claim 16, further comprising engaging connectorized ends of subscriber cables to second ports of the adapters.

18. The method of claim 11, wherein the locking mechanism slides along a base wall of the base of the enclosure between a disengaged position and an engaged position.

19. The method of claim 18, wherein the locking mechanism engages a notch in the first flange of cable spool assembly.

20. A fiber optic distribution terminal comprising:
    an enclosure having:
        a base having a base wall and a plurality of sidewalls that extend outwardly from the base wall;
        a cover pivotally engaged to the base, the base and the cover cooperatively defining an interior region;
    a cable spool assembly disposed in the interior region of the enclosure, the cable spool assembly including:
        a first flange having a flange and an inner drum that extends outwardly from the flange, the flange defining a notch that extends radially inward from an outer edge of the flange;
        a second flange having a tray and an outer drum that extends outwardly from the tray, the outer drum defining a bore, wherein the outer drum is in engagement with the inner drum so that the inner drum is disposed in the bore of the outer drum;
a plurality of adapters disposed on the tray, the plurality of adapters defining a first port and an oppositely disposed second port; and
a locking mechanism slidably disposed on the base wall of the base of the enclosure between a disengaged position and an engaged position, the locking mechanism including an engagement portion that is adapted for disposition in the notch in the engaged position;
a fiber optic cable disposed about the outer drum of the cable spool assembly, the fiber optic cable including a plurality of connectorized ends that is engaged with the first ports of the plurality of adapters.

21. A fiber distribution terminal comprising:
an enclosure including a base and a cover;
a cable spool assembly that receives a distribution cable so that the distribution cable is coiled about the cable spool assembly, the cable spool assembly being engaged to the base so that the cable spool assembly can rotate within an interior region of the enclosure, the cable spool assembly including a first flange and a second flange, the second flange including a tray assembly including a tray and a plurality of fiber optic adapters, the tray being disposed at an offset height from the base that is greater than a height of the base;
a locking mechanism adapted to prevent rotation of the cable spool assembly when the locking mechanism is engaged; and
wherein when the cover is engaged to the base the spool assembly is prevented from rotating by abutment of the tray with the cover, and wherein when the cover is removed and the locking mechanism is disengaged the cable spool assembly can freely rotate to allow the distribution cable to be paid out from a cable slot of the enclosure.

22. The fiber distribution terminal of claim 21, wherein the first flange is generally circular in shape and the second flange is generally rectangular in shape.

* * * * *